Nov. 25, 1924.                                       1,516,675
S. MAGNANO
WARP STOP DETECTOR APPLYING MECHANISM
Filed Jan. 11, 1921    10 Sheets-Sheet 7
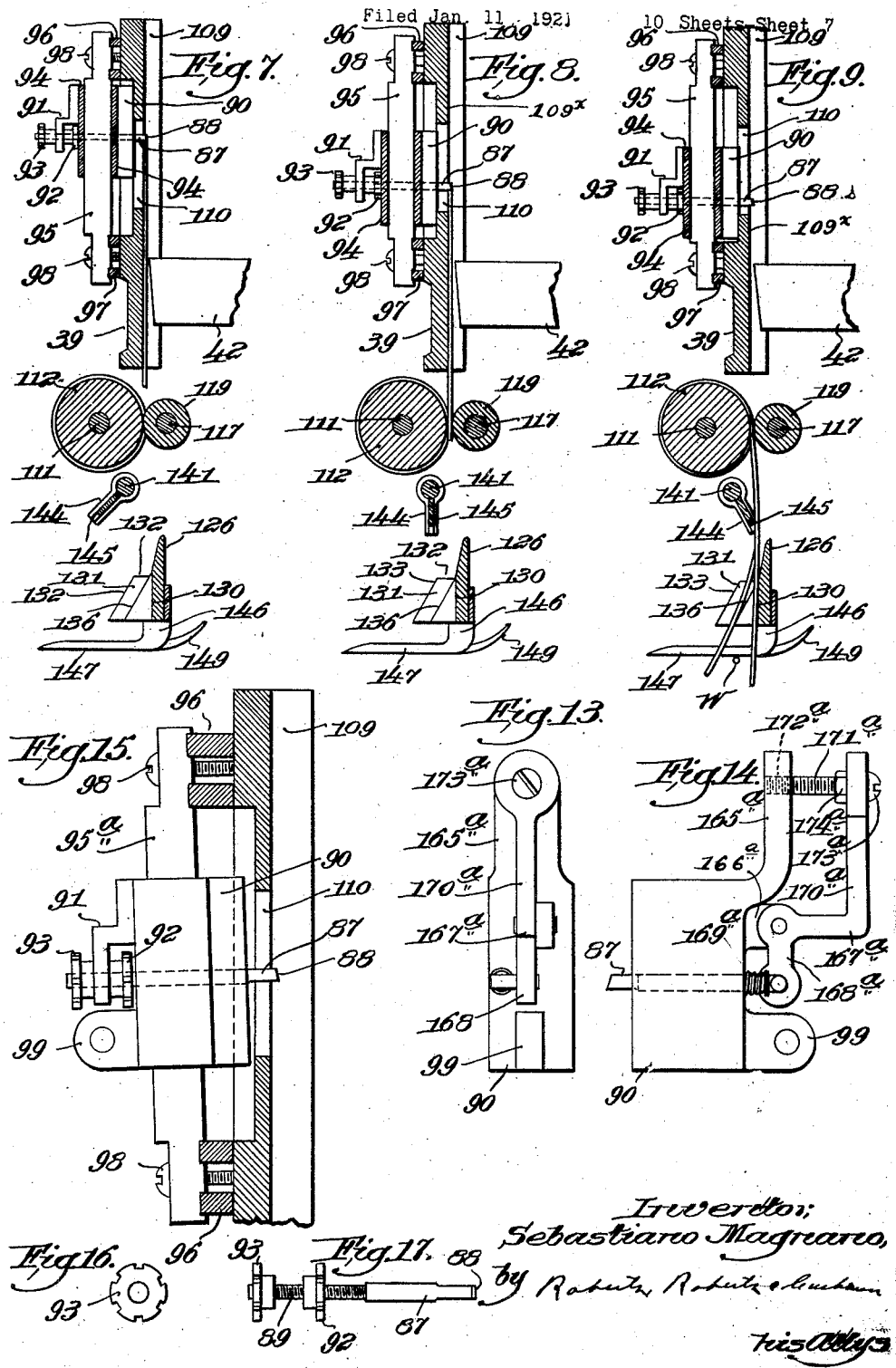

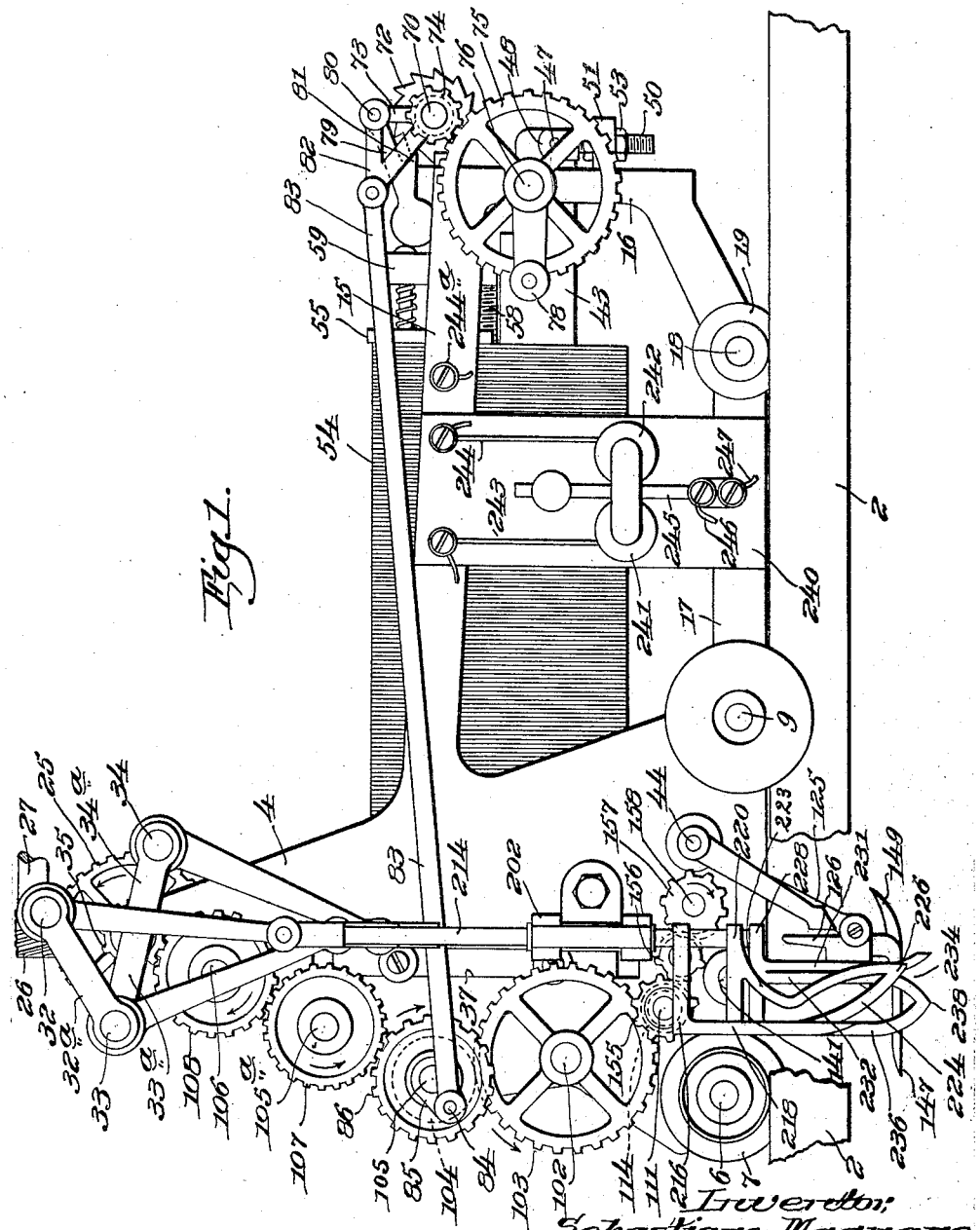

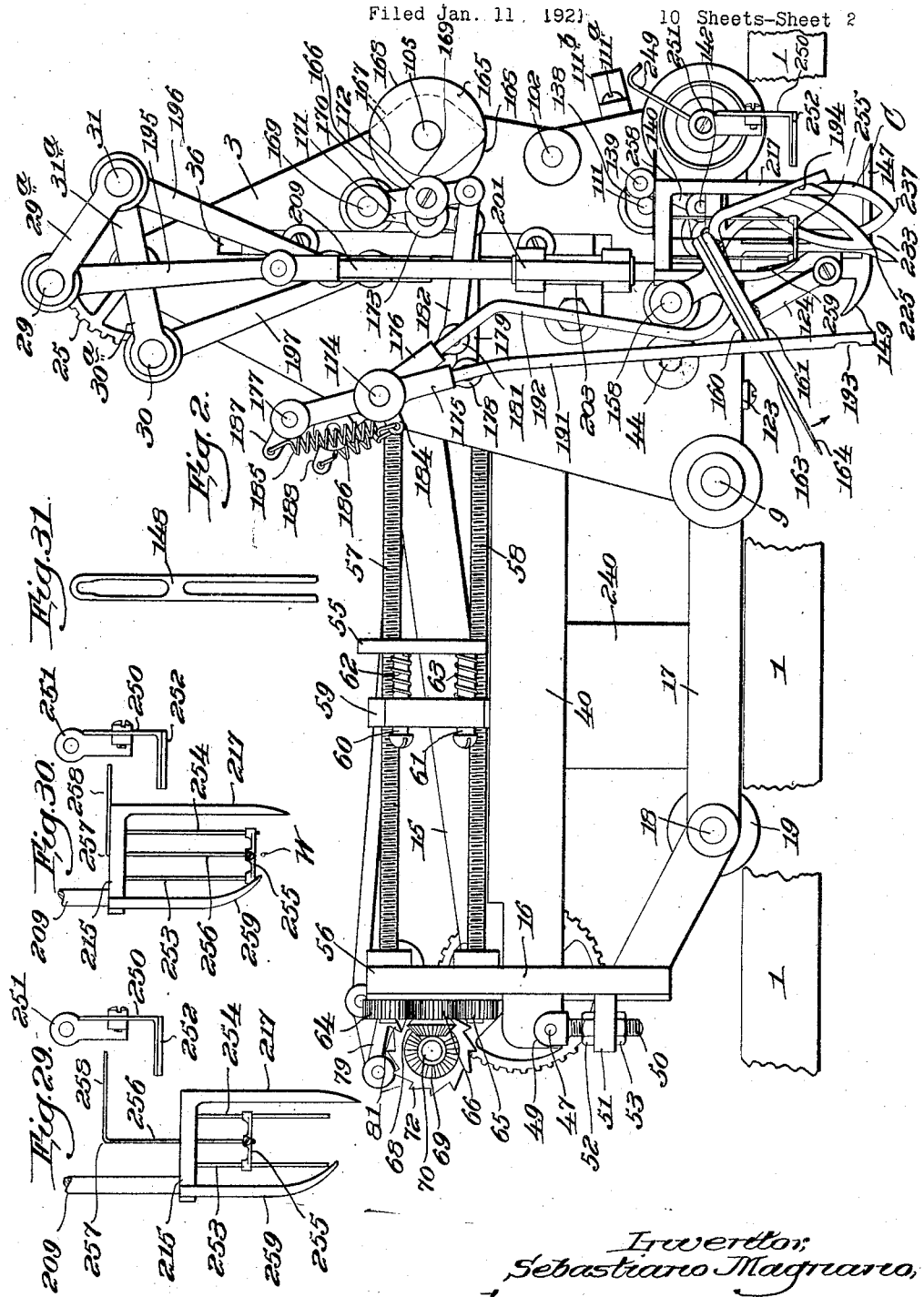

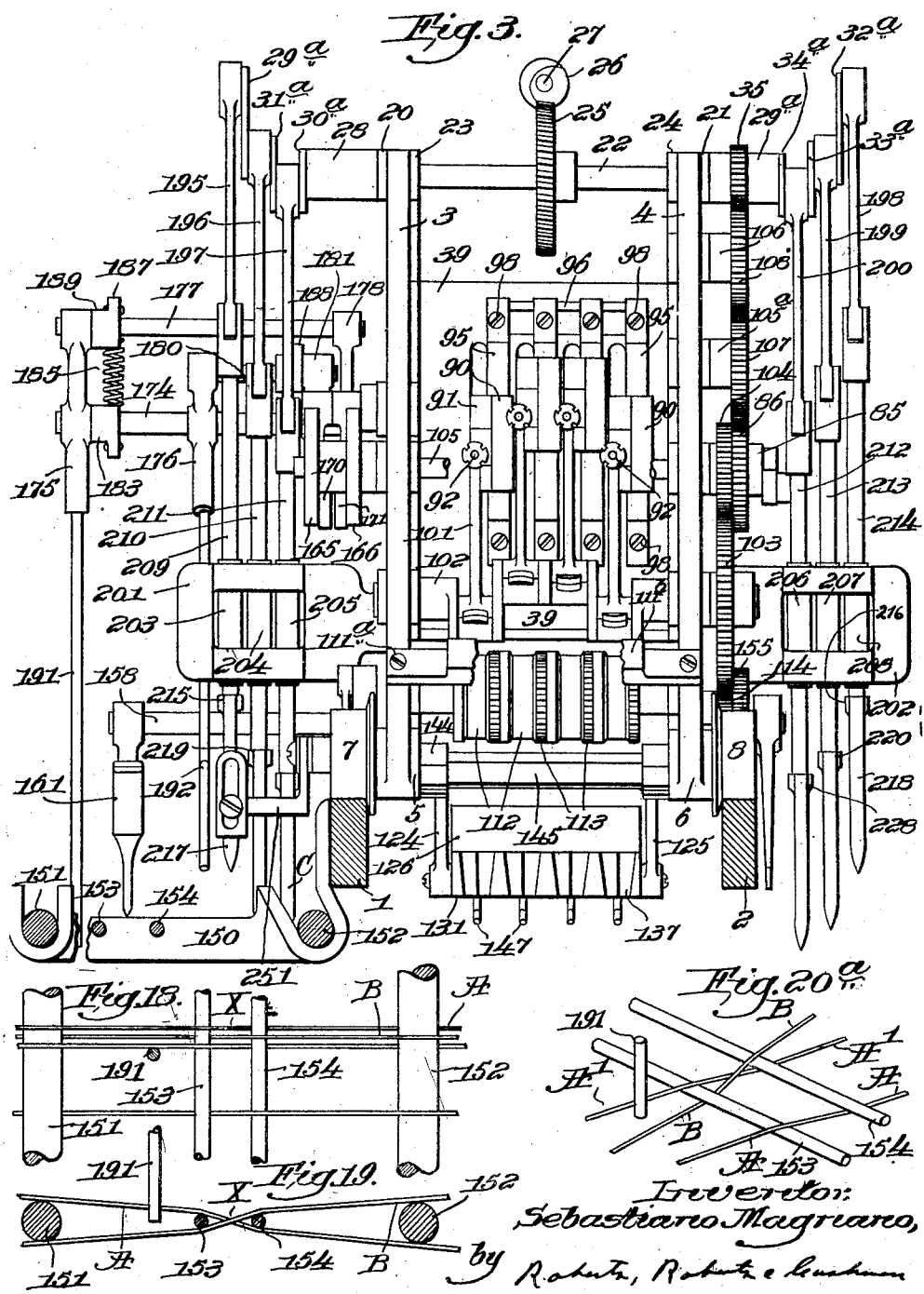

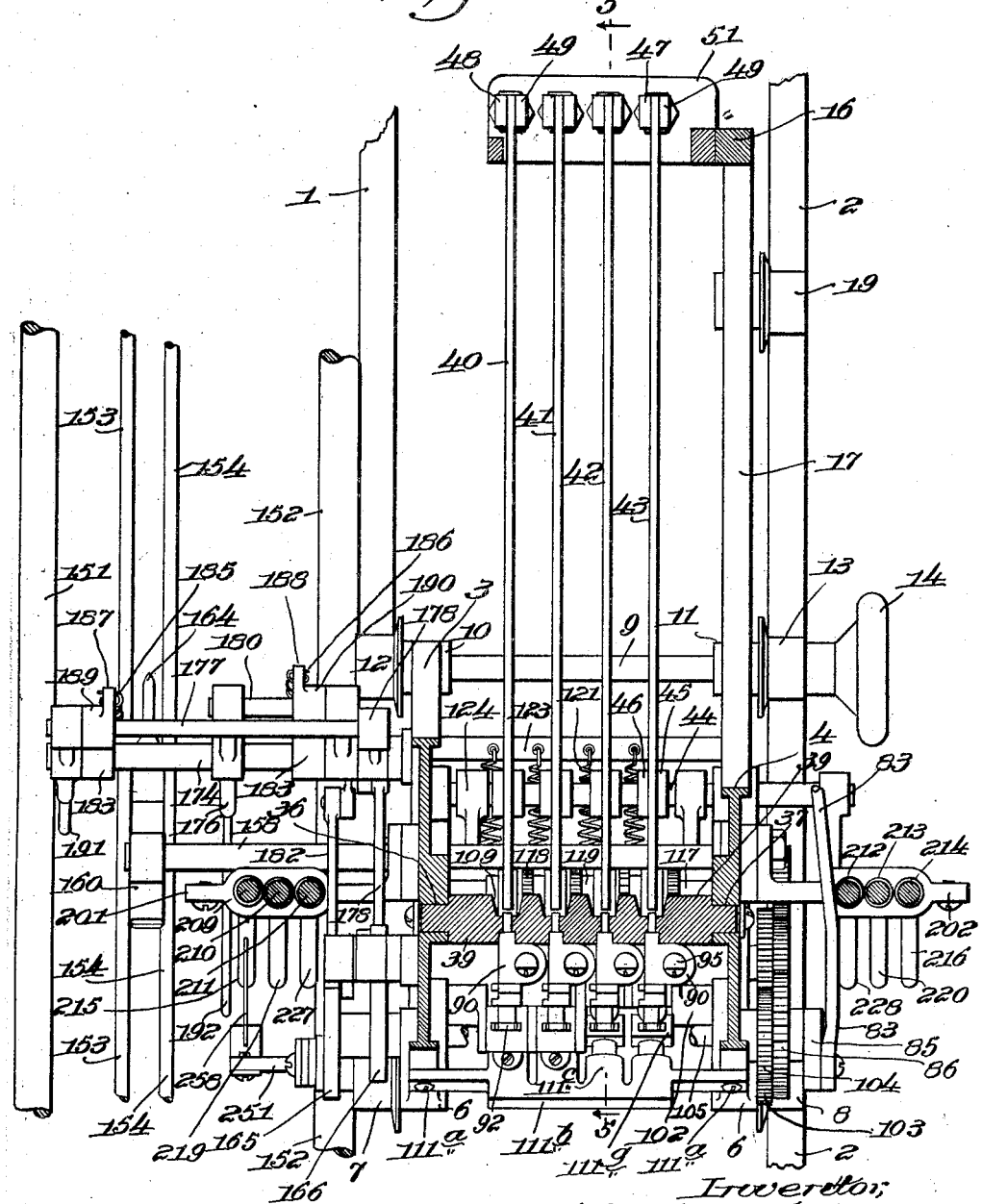

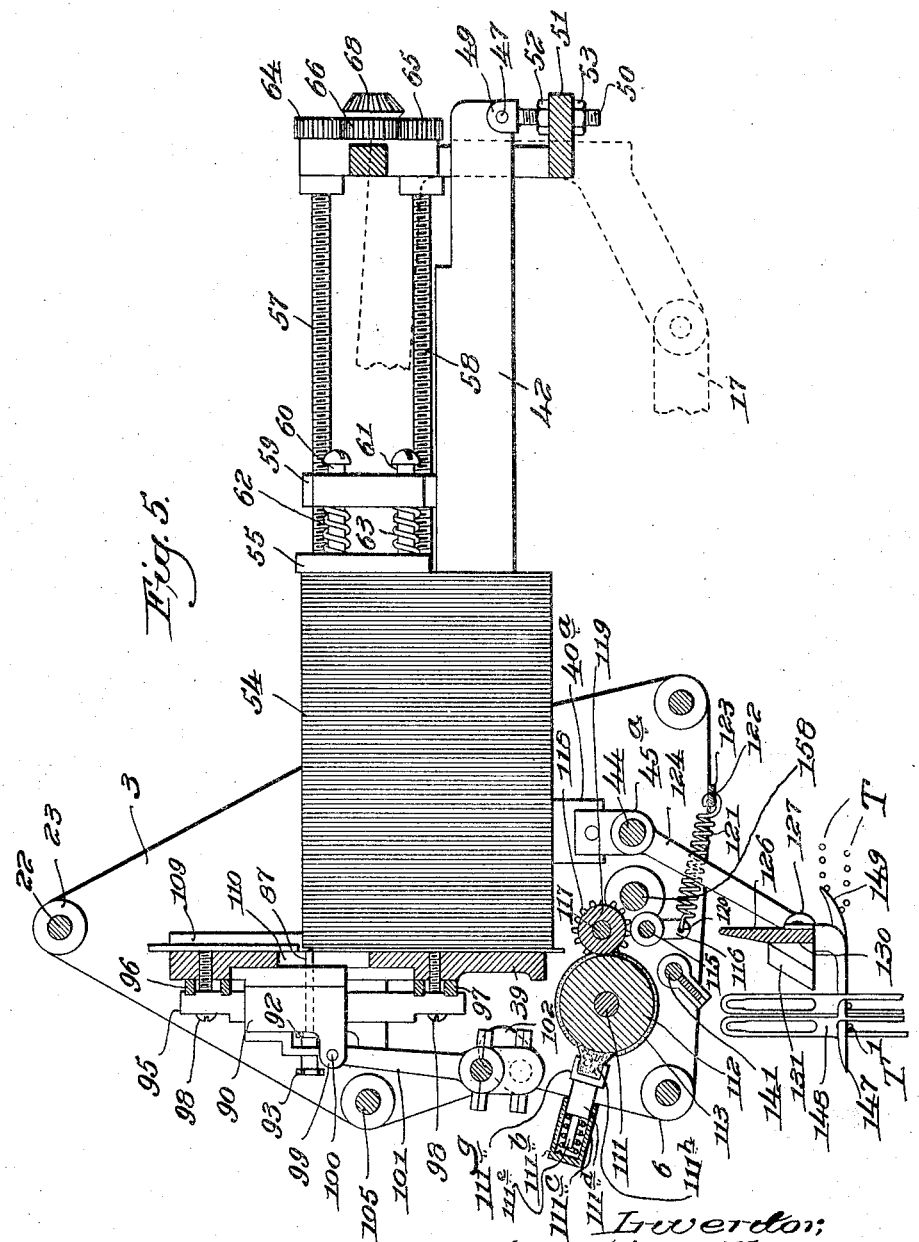

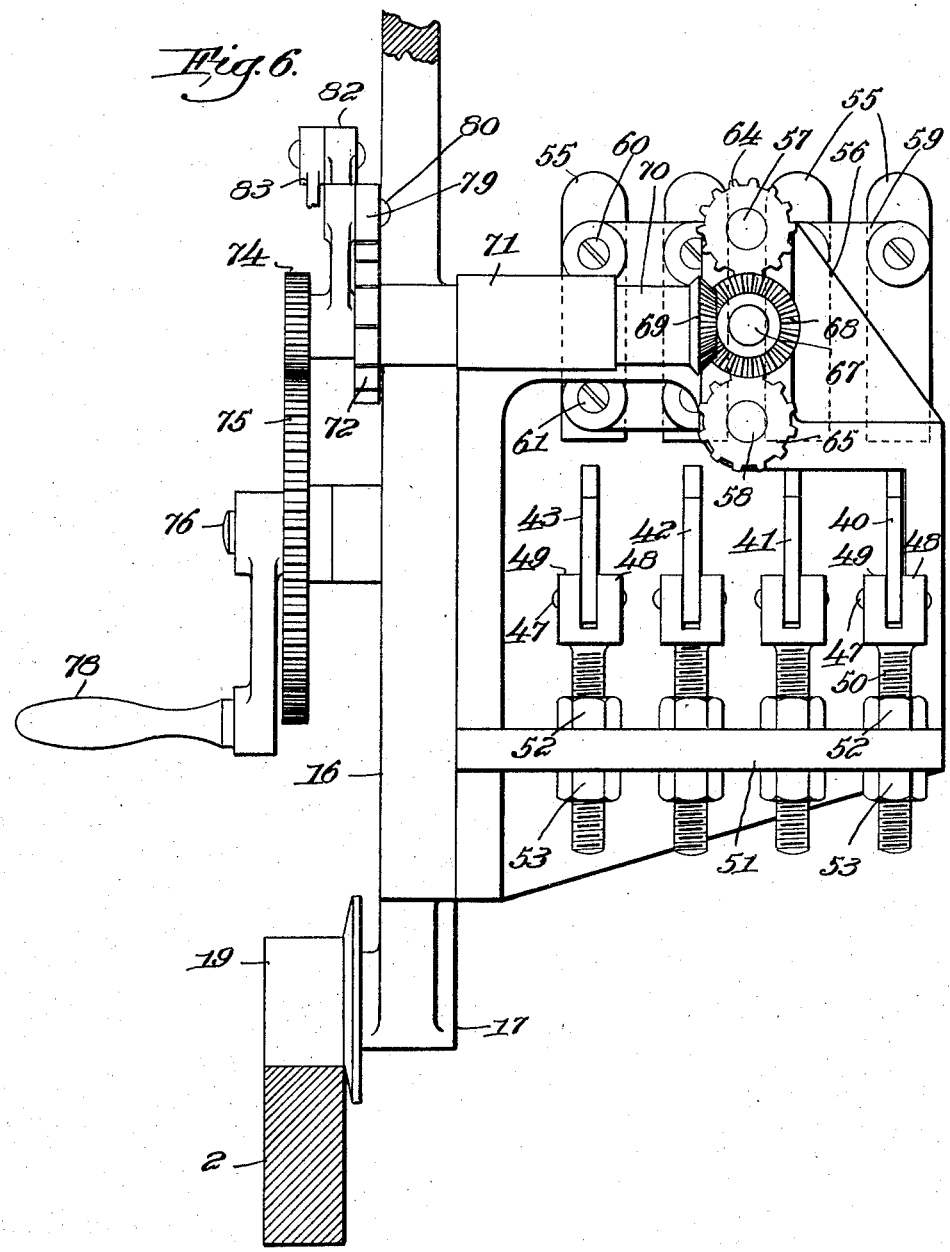

Nov. 25, 1924.
S. MAGNANO
1,516,675
WARP STOP DETECTOR APPLYING MECHANISM
Filed Jan. 11, 1921    10 Sheets-Sheet 8
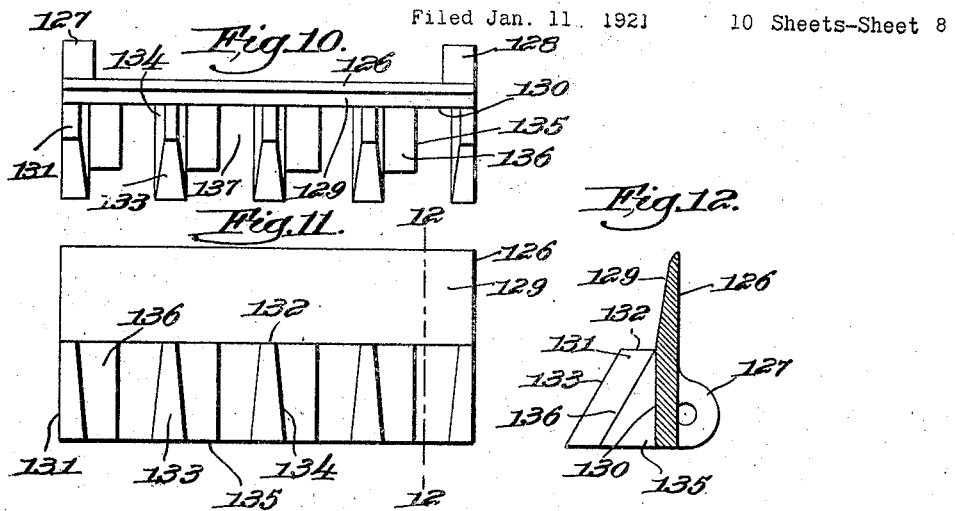
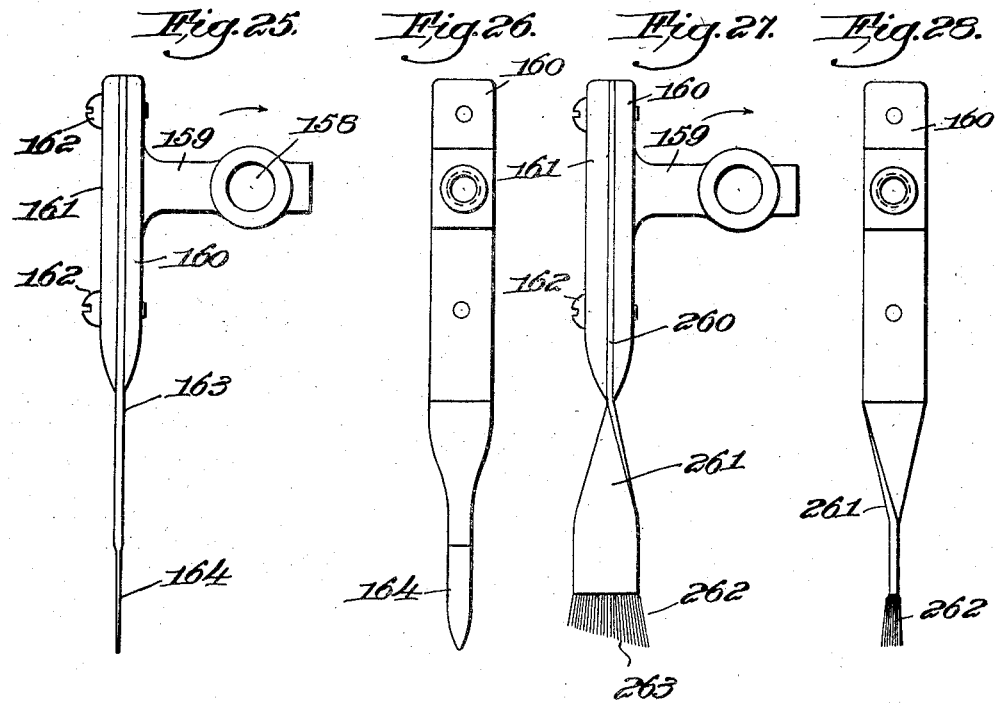
Inventor;
Sebastiano Magnano,
by Roberts, Roberts & Cushman
his Attys.

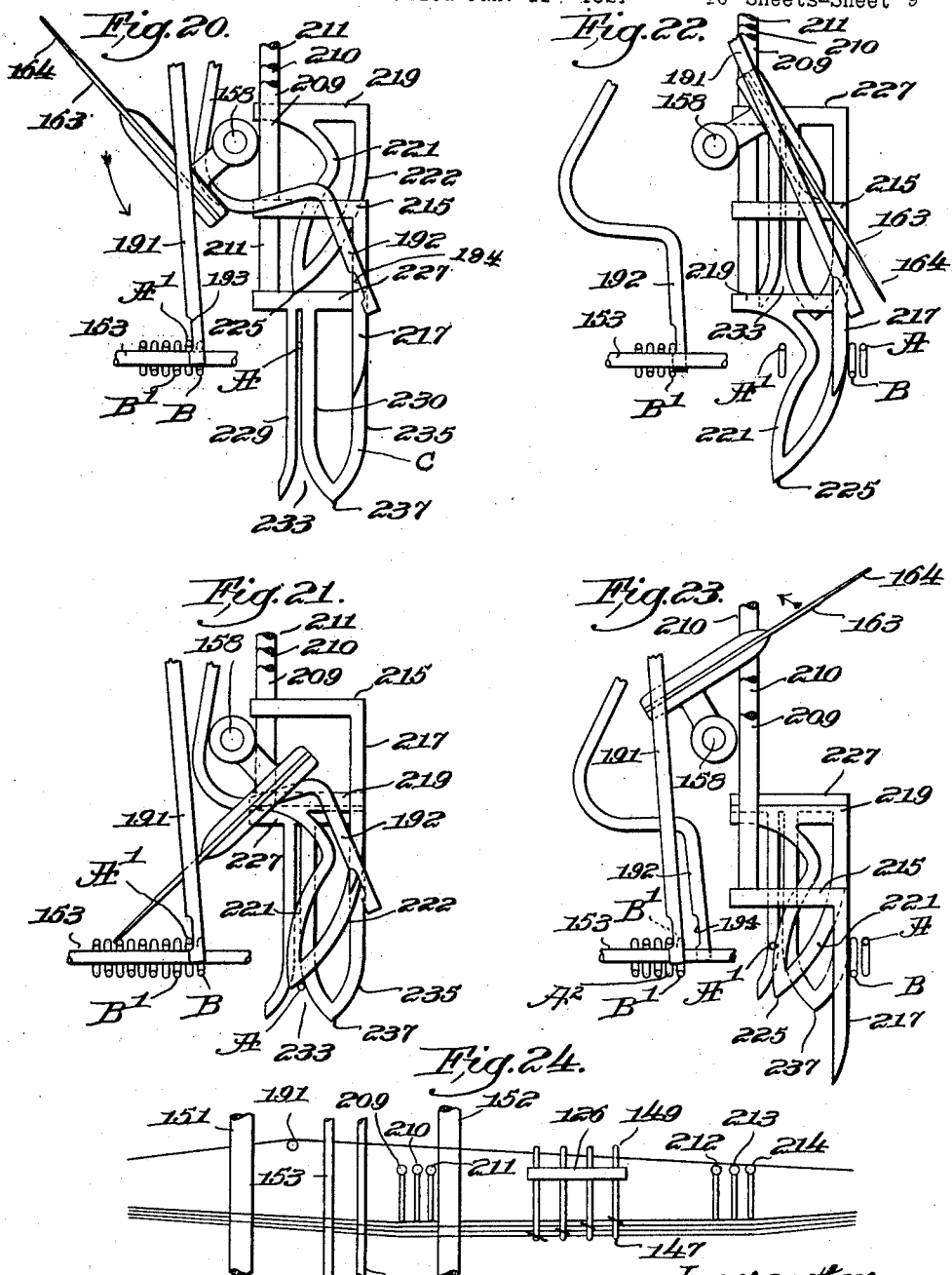

Nov. 25, 1924.
S. MAGNANO
1,516,675
WARP STOP DETECTOR APPLYING MECHANISM
Filed Jan. 11, 1921  10 Sheets-Sheet 10
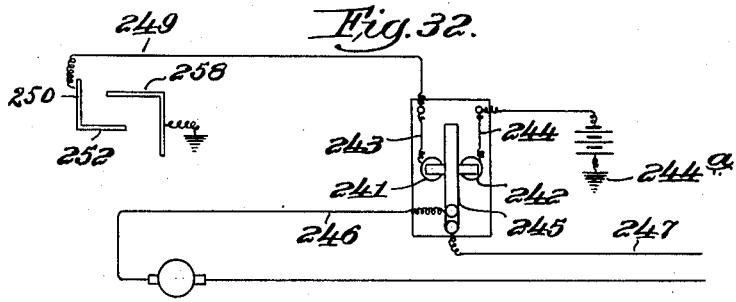
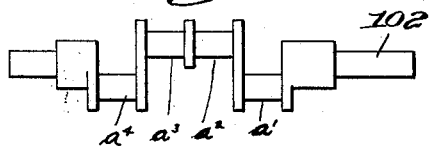
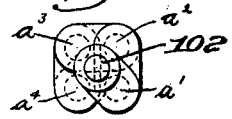
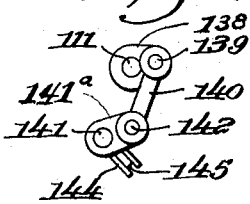
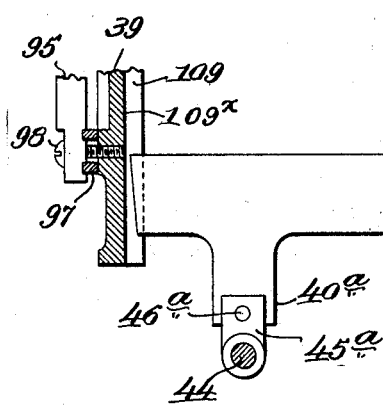
Inventor:
Sebastiano Magnano,
by Roberts, Roberts & Cushman
his Attys.

Patented Nov. 25, 1924.

1,516,675

UNITED STATES PATENT OFFICE.

SEBASTIANO MAGNANO, OF LAWRENCE, MASSACHUSETTS, ASSIGNOR TO MAGNANO CORPORATION, OF LAWRENCE, MASSACHUSETTS, A CORPORATION OF MASSACHUSETTS.

WARP-STOP-DETECTOR-APPLYING MECHANISM.

Application filed January 11, 1921. Serial No. 436,442.

*To all whom it may concern:*

Be it known that SEBASTIANO MAGNANO, subject of the King of Italy, and resident of Lawrence, in the county of Essex and State of Massachusetts, has invented new and useful Improvements in Warp-Stop-Detector-Applying Mechanism, of which the following is a specification.

This invention relates to mechanism for manipulating detached elements of sheet material such for example as warp stop detectors and more particularly to means for mechanically applying detectors of the so called "hair pin type" to a sheet of warp threads while the latter are in position in a loom frame.

In machines of this character as heretofore constructed it has been common to obtain the various motions necessary to the operation of the several instrumentalities employed, and particularly the detector separating devices, by the use of specially designed cams operating through suitable cam followers to give the movements required. From a commercial standpoint, however, employment of cams is objectionable where it can be avoided, as such devices are expensive to manufacture and in use are very inefficient as power transmitting means, while in high speed machines they are noisy and subject to rapid wear, causing inaccuracies in operation of the parts driven thereby. One object of the present invention is to design a machine of the above character in which the employment of cams as driving elements may be largely, if not altogether, eliminated. To this end the necessary movements for the various operative instrumentalities may in accordance with the present invention be obtained by the employment of cranks upon the main drive shaft together with suitable connecting rods and lever mechanism operated thereby.

In certain machines as heretofore constructed, detached warp engaging elements have been positioned in a magazine and removed therefrom one by one in a direction parallel to their lengths by means of a picker device which engages such elements either at an exterior edge of the same or an interior edge formed by an opening through the thickness of the element. In order to secure the necessary motion for separating such element from the other elements held in the reservoir, it has been necessary to impart a relatively long reciprocating movement of the picker which is undesirable particularly in a high speed machine, wherein the rapid movement of reciprocating parts through extended paths produces annoying vibrations. Such long reciprocation is particularly objectionable in machines of the present type wherein several magazines are employed and in which certain magazines may be out of use, the long reciprocation of the picker past the empty magazine consuming energy without productive results, and as in such case the picker meets no substantial resistance in its movement, serious vibrations are set up. As the elements which the picker serves to separate from the magazine may, under different circumstances, be of various lengths, it is necessary when employing machines in which the movement of the picker serves as to sole means for discharging the element from its magazine, to provide for varying the stroke of the picker for each length of such element employed.

An object of the present invention is to avoid the employment of a picker having a long stroke while at the same time providing for the full separation of the warp engaging element from its neighbors. To this end, in accordance with the present invention, a picker having a relatively short stroke may be employed together with a pair of constantly rotating feed rolls. The picker serves merely to separate the end most warp engaging element from the adjacent element moving it down slightly but sufficiently to bring its free end into the bite of the rolls, the latter then serving to move such element through-out the rest of the necessary path of travel of the same, whereby to place it in proper position for engagement with the corresponding warp thread.

In a machine employing a picker such as above noted it is desirable to provide for a delicate adjustment of the picker member to enable the user of the machine to obtain the best results when operating upon warp engaging elements of slightly different thickness. A further object of the present invention is to provide for such adjustment of the picker element, and to this end such element may be carried upon the short arm of a lever member, the other arm of which is adjustable by means of a screw thread of fine pitch or equivalent device.

As above noted the picker contacts with the warp engaging element upon an external or internal edge of the latter, and as the thickness of such warp engaging element is relatively small, and as such elements are held in the magazine in compact relation, it is found to be difficult to secure the proper engagement of the picker with the edge of the foremost element without engaging the next adjacent element. Such action would be extremely undesirable and if occurring frequently would render the mechanism substantially useless for the purpose designed. A further object of the present invention is to provide picker mechanism in which such possibility of improper engagement of more than one of such thin elements is eliminated. To this end the picker member, which heretofore has commonly moved in a path substantially parallel to the longitudinal surface of the warp engaging element with which it is to cooperate, is caused to move in a path slightly inclined to such face of the warp engaging element. By this arrangement, the picker, when first contacting with the edge of such element, extends but slightly over such edge, but as the picker continues its picking off stroke, it is caused gradually to move into engagement with an increasing area of such edge. By this means any possibility of improper contact of the picker with the warp engaging element next adjacent that one which it is desired to pick off is avoided.

For spreading the ends of a drop wire of the "hair pin" type as such wire is pushed down over the warp, there has heretofore been used a hook formed of round wire which is so operated during the depression of the detector as to spring one of the arms of the latter forwardly relative to the other to permit it to straddle the thread. This arrangement while of practical utility is found to possess certain defects in commercial use and a further object of the present invention is to provide improved means for spreading the ends of the drop wire as it is moved downwardly. Such means may comprise guides for the free ends of the drop wire, one of such guides being inclined relatively to the other, and cooperating with said guides may be a rocker member which serves to force the drop wire rearwardly into contact with said guides during the descent of the drop wire, thus causing one of the free ends to move downwardly in a path behind the other.

Some difficulty has been found in prior machines in keeping the drop wires as they are discharged from each magazine from tipping sidewise as they are deposited upon the thread of the warp, such tipping causing them to interfere with the drop wires discharged from the next adjacent magazine. This tipping usually takes place at that portion of the bank of discharged drop wires adjacent the point of discharge, as after a sufficient number have been placed in contact and compacted, the friction between such drop wires serves to prevent accidental tipping of the same. A further object of the present invention is to provide means for avoiding such tipping of the newly discharged drop wire. For this purpose a guide rod may be provided extending forwardly below the point of discharge of the drop wires from each magazine, such guide rod terminating at a desired point forward of the front face of the machine. Such guide rods together with the warps serve in a very efficient manner to prevent tipping of the drop wires, while such rods act also to hold the warp threads, which contact with their under sides, in a predetermined plane for the reception of the drop wires. These rods also take the blow of the impact of the falling drop wire, thus relieving the warp threads therefrom and avoiding one cause of breakage of the warp threads common to machines adapted to place detached loom elements in engagement with warp threads.

It is common in devices of the class described wherein detached warp engaging elements are stored in a magazine, to provide guide bars within the magazine for holding such elements in proper position for their discharge. A further object of the present invention is to improve the arrangement of such guide bars whereby to permit their ready adjustment to secure the best results in releasing the warp engaging elements therefrom. One mode of arranging such guide bars consists in pivoting them at points adjacent those ends thereof from which the warp engaging elements are discharged and providing for the other ends of said bars adjustable supports preferably in the form of rods having screw threads of relatively fine pitch.

When machines of the character described are employed for placing detached elements in position for engagement with silk warps, difficulty has been experienced due to breaking of the warps by the abrasive action of the separator means commonly employed for parting the last warp of the series for the placing of a warp engaging element relatively thereto. Such separator has commonly been of flexible but relatively hard material such as spring steel, and as it frequently engages several warps before separating the last warp from the series, it in consequence may slip over the same warp more than once, thus weakening the warp sufficiently to cause it to break under subsequently applied strains. A further object of the present invention is to improve such separating means whereby to avoid such undesirable abrasive effect on the warp threads. One mode of attaining this object is to employ a relatively soft and resilient material as the engaging element of the separator device, the preferred arrangement comprising a brush providing a resilient warp contacting surface such as a tuft of bristles sufficiently flexible to avoid undue strain upon the warp threads while at the same time serving to separate the last warp from the series.

In order to permit the ready separation of the last warp thread by the separator device it has been proposed to employ lease rods for dividing the warps into upper and lower sheets, the warps of one sheet being transferred in crossing relation to the warps of the other sheet at a point between the lease rods. With this arrangement it is desirable to maintain the upper and lower sheets of warp a sufficient distance apart to prevent any contact therebetween, but this requires the employment of lease rods of substantial diameter at a point closely adjacent the location of the picking device. An object of the present invention is to provide means whereby the crossing of the warps may be accurately determined, such crossing always occurring in the vertical plane of movement of the separator device, while at the same time providing for the holding back of the warps of the two series by the engagement therewith of the hold back devices at points laterally removed from the point of separation. To this end lease rods of relatively small diameter may be employed adjacent the picking mechanism and other rods of larger diameter may be inserted between the warp sheets at points laterally removed from the first lease rods.

Machines for depositing detached warp engaging elements upon the threads of a warp supported in a loom frame have never heretofore so far as is known, been provided with any means acting automatically to stop the operation of the placing mechanism upon breaking or absence of the warp thread with which the detached element is to be engaged. A further object of the present invention is to provide means acting automatically to stop the machine in such event and for this purpose a feeler member may be employed, such feeler member being dropped in position to engage the last warp thread if the latter is in position to receive the warp engaging element, such drop member, however, serving, upon absence of the warp thread, to close an electrical circuit whereby stop mechanism may be actuated. A preferred arrangement for carrying the above objects into effect is disclosed in the accompanying drawings, in which,—

Fig. 1 is a right side elevation of the machine arranged in position for use, certain parts being broken away to show interior constructions:

Fig. 2 is an elevation of the left side of the machine;

Fig. 3 is a front elevation of the machine;

Fig. 4 is a plan view of the machine, certain parts being shown in cross section;

Fig. 5 is a longitudinal cross section substantially on the line 5—5 of Fig. 4;

Fig. 6 is a rear end elevation of the machine to larger scale;

Figs. 7, 8, and 9 are fragmentary cross sections on substantially the same plane as Fig. 5 illustrating various steps in the separation of the drop wires from the magazine and their placing over the warps;

Fig. 10 is a plan view and;

Fig. 11 is a front elevation to large scale of a device for spreading the drop wires as they are deposited upon the warps;

Fig. 12 is a cross section of the device shown in Fig. 11 on the line 12—12 thereof;

Fig. 13 is a front view and

Fig. 14 is a side elevation of a modified form of device for adjusting the picker members;

Fig. 15 is a cross section similar to the upper portion of Fig. 7 but to enlarged scale illustrating a modified arrangement for guiding the picker elements.

Figs. 16 and 17 are front and plan views respectively of a picker member of preferred form, with the adjusting means therefor;

Fig. 18 is a plan view; and

Fig. 19 is a vertical cross section illustrating the arrangement of the lease rods and the warps passing thereover;

Figs. 20, 21, 22 and 23 are views to enlarged scale illustrating the operation of the thread separating and positioning elements in various positions of the cycle of movements thereof.

Fig. 20ª is a diagrammatic perspective view illustating the relative position of the warp threads shown in cross section in Fig. 20.

Fig. 24 is a diagrammatic plan view illustrating the relative arrangement of the various warp engaging elements to the machine;

Fig. 25 is a side elevation; and

Fig. 26 is a rear elevation to enlarged scale illustrating a form of separator blade which may be employed for picking off the threads.

Fig. 27 is a side elevation; and

Fig. 28 is a rear elevation of a modified form of the separator element:

Figs. 29 and 30 are diagrammatic illustrations of a stop motion actuating feeler finger showing two positions thereof;

Fig. 31 is an enlarged front elevation of a drop wire of a common type and for use with which this machine is particularly intended;

Fig. 32 is a diagrammatic view illustrating the arrangement of the stop motion circuit;

Figs. 33 and 34 are detail views of the crank shaft for operating the pickers;

Fig. 35 is a side elevation of the drive mechanism whereby the rocker bar is actuated, and Fig. 36 is a side elevation of one of the magazine bars to enlarged scale with associated parts in section.

*Main frame.*

1, 2 are rail members which may be considered as constituting portions of the machine, such rail members being adapted temporarily to be supported upon a loom frame transversely of the warp threads stretched therein and serving to support the operative portions of the machine as the latter is moved from one side of the loom frame to the other. The frame of the machine proper comprises a pair of spaced side plates 3, 4, such side plates being held in spaced relation by certain of the parts supported therebetween and which will be described more at length hereinafter. At the lower forward corners of the plates 3 and 4 are provided bosses 5, 6 in which are fixed stub shafts having mounted thereupon flanged truck wheels 7, 8 respectively, such wheels being adapted to be supported upon the upper edges of the rails 1, 2. Passing through suitable openings in the rear lower corners of the members 3, 4 is a shaft 9, such shaft having collars 10, 11 fixed thereon upon the inner side of the respective frame members and having secured at the outer sides of said members a pair of flanged truck wheels 12, 13, such wheels also resting upon the rails 1, 2. The shaft 9 may if desired be extended to the right of the wheel 13, and to such extension may be secured a hand wheel 14 by the rotation of which the shaft, together with the wheels 12, 13 may be turned, thus providing for the manual traverse of the frame, with the mechanism supported thereon, along the tracks. The right-hand frame member 4 is preferably provided with a rearwardly extending member 15 (Fig. 1) which may be integral with the member 4 or fixed thereto in any desired manner. The member 15 extends downwardly as at 16 and forwardly as at 17, being connected at its forward extremity to the lower portion of the frame member 4. For convenience of construction, the member 17 may, if desired, be made as an independent member secured at its ends to the member 4 and the member 16 respectively, the exact arrangement of such parts however being unessential.

Adjacent the rear extremity of the member 17 is provided a stub shaft 18 carrying a flanged truck wheel 19 engageable with the rail 2 and serving to support the members 15, 16, 17 with their associated parts.

Near their upper extremities, the plates 3 and 4 may be provided with bosses 20, 21 (Fig. 3) having aligned openings therethrough for the reception of a main driving shaft 22, such shaft having collars 23, 24 fixed thereon and bearing upon the inner sides of the frame members, respectively. Fixedly secured upon the shaft 22 is a worm wheel 25 engaging which is a worm 26 mounted upon a shaft 27 which is preferably driven directly by an electric motor (not shown) suitably supported upon the frame or parts carried thereby. To the left of the frame member 3, as indicated in Fig. 3, is arranged a sleeve 28 fixed upon the shaft 22 and to the right of the frame member 4 a similar sleeve 29ᵃ is secured to the shaft 22. Integrally or otherwise secured to the sleeve 28 is a three-part crank providing the crank pins 29, 30, 31, respectively, (Fig. 2) and to the extremity of the sleeve 29ᵃ is secured a similar three-part crank providing crank pins 32, 33, 34, (Fig. 1) such crank pins serving to drive mechanism to be hereinafter described. Fixed upon the shaft 22 or integral therewith at a point intermediate the sleeve 29ᵃ and frame 4 is a gear wheel 35 such gear wheel serving to actuate certain mechanism hereinafter referred to. The frame members 3, 4 are provided with vertical aligned slots 36, 37 respectively with which are adjustably engaged the lateral edges of a vertically slidable head or carrying plate 39, this plate serving as a support for the picker mechanism presently to be described.

*Magazine.*

The magazine employed in connection with this machine is of quadruplex type, permitting the successive discharge of drop wires or similar elements from four independent series. For supporting the drop wires in such independent series, the magazine comprises four substantially parallel supporting bars 40, 41, 42, 43 respectively. Such bars are of a thickness such as to permit the suspension thereon of drop wires of the hair-pin type, the legs of such drop wires straddling over the bars.

The bars as herein shown, (Fig. 36) are, at their forward ends, provided with downwardly extending lugs 40ᵃ whereby they are pivotally supported as by means of pins 46ᵃ between ears 45, 46 (Fig. 4) of castings as 45ᵃ (Fig. 36) such castings being secured in any desired manner to a fixed shaft 44 extending transversely of the frame and somewhat to the rear of the head or carrier plate 39. The bars 40 to 43 inclusive, at their rear extremities, are pivoted respectively, as by means of pins 47 between pairs of upstanding ears 48, 49 carried upon the upper ends of screw-threaded rods 50. The rods 50 pass through vertical openings in a horizontally disposed bracket member 51 supported by the frame member 16, and may be adjusted by means of nuts as 52, engaging the screw-threads of the rods 50, such nuts resting upon the upper surface of the bracket 51. Lock nuts 53 may be employed for holding the parts in adjusted position. By the adjustment of the rods 50 the bars 40 to 43 inclusive may be nicely adjusted whereby to determine the inclination of their upper supporting surfaces and the distance of the forward or discharge ends of the same from the rear face of the head or plate 39.

In Fig. 1, 54 indicates a series of drop wires supported upon the bar 43 and for compacting and feeding forward the drop wires toward the forward extremities of the bars, each bar may be provided with a spring-pressed follower plate 55 arranged to engage the rearmost drop wire of the series carried by such bar. The member 16 has connected thereto or integral therewith an upwardly extending member 56 (Fig. 6) having bearings therein for the rear ends of a pair of screw-threaded shafts 57, 58, the forward extremities of which are suitably supported in any suitable manner adjacent the head 39. Such shafts have threaded engagement with screw-threaded openings in the upper and lower portions respectively of a slidable plate 59 arranged above the upper edges of the bars 40 to 43 inclusive. Passing freely through pairs of vertically spaced openings in the plate 59 are rods such as 60, 61 (Figs. 2 and 6), the rods of each of the respective pairs being fixedly secured to a corresponding plate 55. Compression springs 62, 63 encircle the rods 60, 61, being interposed between the member 59 and the several plates 55, the latter thus being resiliently urged away from plate 59. The rear ends of the shafts 57, 58 where they extend through the frame member 56 have secured thereto pinions 64, 65, said pinions meshing with a pinion 66 (Fig. 2), carried upon a stub shaft 67 fixed in the frame member 56. Fixedly secured to the pinion 66 is a bevel gear 68 meshing with a similar beveled gear 69 carried upon a transverse shaft 70 having bearings at 71 (Fig. 6) in the frame, said shaft extending to the right of the frame and having secured thereto a ratchet wheel 72. The shaft 70 is continued to the right of the ratchet wheel 72 (Fig. 1) and has pivotally supported thereon a pawl actuating lever 73. The shaft 70 also has secured to its outer extremity, to the right of the lever 73, a pinion 74 meshing with a gear wheel 75 journaled at 76 upon the frame member 16, said gear wheel 75 having a manually operable crank handle 78 by means of which it may be turned. 79 is a weighted pawl pivotally secured at 80 to the upper end of the lever 73 and having a tooth 81 for engagement with the teeth of the ratchet wheel 72. The lever 73 has a forwardly extending arm 82 to which is pivotally connected the rear extremity of a bar 83 extending toward the forward end of the machine where it is connected to a crank pin 84 carried by a crank 85 fast to a gear wheel 86. By the arrangement of parts thus described it will be clearly evident that upon rotation of the wheel 86, the lever 73 will be oscillated, thereby causing the pawl 79 to turn the shaft 70 intermittently. The rotation of the shaft 70 through the gears above described, serves to rotate the screw shafts 57, 58, and thereby to feed the plate 59 slowly toward the forward end of the magazine members 40, 41, 42, 43. The plates 55, bearing against the rearmost drop wires of the respective series are thus forced forwardly, moving the wires composing such series slowly towards the discharge ends of the several magazine bars. The springs 62, 63 serve to compensate for any slight variations between the rate of forward feed and the rate of discharge, it being understood that the pitch of the screw threads 57 is calculated in accordance with the thickness of the drop wires for which the magazine is designed.

Pickers.

Cooperating with each of the magazine bars 40, 43, inclusive, is a picker device for moving the foremost drop wire of the series in a direction substantially parallel to the length thereof, whereby to initiate its discharge from the magazine. As seen more particularly in Figs. 5, 7, and 17, each picker member comprises a bar 87 having its rear end beveled as at 88 thus providing a sharp rearwardly directed edge and a substantially flat lower surface. The picker member as indicated in Fig. 17 at its forward portion is preferably of circular cross section and screw-threaded as indicated at 89. For supporting the picker elements 87, brackets such as shown at 90 (Figs. 4 and 8), may be employed, such brackets providing guide openings for the rearwardly extending portions of the pickers and having outstanding, forwardly directed members 91 (see Fig. 7), provided with openings for the passage of the screw-threaded portions 89 of such picker elements. 92, 93 are adjusting nuts, one being located behind the member 91 and one in front of the same, such adjusting elements engaging the threaded portion 89 of the picker and serving to permit accurate front to rear adjustment and locking of the picker in desired position.

The brackets 90 comprise sleeve portions 94 mounted to slide vertically on fixed guide rods 95, such rods preferably being of substantially circular cross section at their guiding portions and being seated in suitable cradles 96, 97 at their upper and lower ends respectively. Such cradles rest upon the front faces of the carrier plate or head 39 and the guide members are held in fixed position therein by means of screws or bolts 98. Each bracket 90 is provided at its lower portion with a forwardly extending ear 99 (Fig. 5), such ear having secured therein pins 100 upon which are journaled the upper extremities of connecting rods 101. 102 (Figs. 33, 34) is a crank shaft extending transversely between the frame members 3, 4 and journaled in suitable openings therein, such crank shaft being held in proper operative position by means of fixed collars thereon. The crank shaft 102 is provided with four crank arms having crank pins $a^1$, $a^2$, $a^3$, $a^4$ respectively arranged substantially 90° apart, and upon each of said crank pins is journaled the lower extremity of one of the connecting rods 101 above referred to. The right-hand extremity of the shaft 102 extends to the right of the member 4 and has fixedly secured thereon the gear wheel 103, such gear wheel meshing with a gear wheel 104 fast upon a shaft 105 extending transversely through the frame members 3, 4, such shaft also having fixed thereon the gear wheel 86 hereinbefore referred to.

Secured in the frame member 4 are a pair of stub shafts 105ª, 106 having mounted to turn thereon a pair of meshing gear wheels 107, 108 respectively, the wheel 107 meshing with the wheel 86 and the wheel 108 meshing with the wheel 35 upon the shaft 22. By the arrangement of parts above described it will be evident that upon rotation of the shaft 22, the crank shaft 102 will be turned and thereby the several brackets 90 will be caused to reciprocate upon their respective guide rods. The several gears of the gear train including the gears 25 and 103 are of such relative diameters that the velocity ratio of the shafts 22 and 102 is as four to one. Thus upon each rotation of the shaft 22, one of the brackets 90 will be caused to complete a full downward and upward movement, the relative arrangement of the crank pins upon the shaft being such as to cause the several brackets 90 with their pickers 87 to move downwardly in succession. As will be clearly seen from inspection of Figs. 4 and 36, the rear face of the head or plate 39 is provided with a series of vertical slots or pockets 109, the respective slots or pockets extending in the vertical planes of the several magazine bars 40 to 43, inclusive. Such bars extend into said pockets but terminate at a distance from the rear or bottom walls 109ˣ of said pockets substantially equal to the thickness of one of the drop wire elements. This distance may readily be varied by adjustment of the screw rods 50 as above described.

Extending through the plate 39 and the bottom walls of said pockets are longitudinal slots 110 (Fig. 7) through which project the rear portions of the picker members 87, and as will be clear from inspection of Figs. 5 and 7, such picker members project to the rear of the bottom walls of said pockets a distance very slightly less than the thickness of such a drop wire element. As the series of drop wires are compacted against the bottom walls of said pockets by the action of the spring pressed followers 55 as above described, it will be clearly evident that upon movement of one of the brackets 90 with its picker 87 from the position shown in Fig. 7 to that shown in Fig. 8, the lower flat surface of the picker member will be caused to contact with the upper edge surface of the foremost drop wire element and will force the latter in a direction parallel to its length downwardly through the space existing between the forward end of the corresponding magazine bar and the bottom wall of the pocket.

By the provision of the adjusting screws 92, 93, the rearward position of the picker member may be so adjusted as to cause it to engage over substantially the entire area of the upper edge of the foremost drop wire without contacting with the next adjacent drop wire. The sharp chisel edge of such picker facilitates such nicety of adjustment.

Feed rolls.

While under certain circumstances it may be desirable to cause the pickers to move throughout a length of stroke sufficient to fully discharge the drop wires from the magazine, in accordance with the present disclosure the stroke of the picker carrying element is merely sufficient to cause the drop wires to be projected to a predetermined distance below the lower edge of the plate 39, whereupon the further movement of the drop wire element may be continued by secondary means.

Such secondary means as herein disclosed may comprise a shaft 111 extended transversely between the frame members 3 and 4 and journalled therein, such shaft having fixed thereon, at points corresponding to the several pickers, a series of feed rolls 112, each of said feed rolls having secured thereto a gear wheel 113. The shaft 111 is extended to the right of the frame member 4 and has fixed thereon, a pinion 114 (Fig. 3). This pinion meshes with the gear wheel 103 whereby the shaft 111 is driven. Upon a shaft 115 (Fig 5) extending transversely between frame members 3 and 4 are a series of arms of which one is shown at 116, these arms swinging upon the shaft as an axis. Upon each of the members 116 is a stub shaft 117 upon which is mounted to turn a gear 118, the several gears 118 meshing with the gears 113 upon the shaft 111. Fixed to each of the gears 118 is a roll 119 which normally engages the corresponding roll 112. Arms 116 are extended below shaft 115 and have secured at 120, springs 121 the opposite ends of which are fixed as at 122 in the transversely extending bar 123. The springs 121 thus serve to swing the arms 116 in a counter-clockwise direction as seen in Fig. 5, whereby to bring the rolls 119 into engagement respectively with the rolls 112. The rolls 112, 119 as thus arranged constitute means for feeding onward the drop wires as they are pushed downwardly from the magazine by the reciprocating pickers. The action of the rolls in thus gripping the drop wire presented thereto is clearly illustrated in Fig. 8. By the employment of constantly driven feed rolls it is possible to shorten the length of stroke of the pickers, whereby the excessive vibration attendant upon the use of pickers having a stroke sufficient to move the drop wires fully from the magazine as well as the difficulty in guiding such pickers with extreme accuracy through a long stroke is very largely avoided. Moreover it is possible with the arrangement above described to feed drop wires of widely different lengths from the magazine without the necessity of changing or adjusting any of the pickers, it being merely sufficient that the pickers move the drop wire to the position where it is engaged by the feed rolls, whereupon the constant rotation of the latter serves to withdraw the drop wire from the magazine regardless of its length.

Spreader.

124 and 125 are a pair of downwardly extended brackets fixedly supported at their upper ends on the shaft 44. 126 is a transversely extended bar having at its opposite ends rearwardly extended ears 127 and 128, whereby said bar may be attached to the lower ends of the respective brackets 124 and 125. The forward face of the bar 126 provides at its upper portion a surface 129 slightly inclined to the vertical, the lower portion 130 lying in a substantially vertical plane. Extending outwardly and in a forward direction from said vertical surface are a series of lugs 131, such lugs having substantially horizontal upper faces 132, and the inclined forward faces 133. The lateral surfaces of the lugs are also slightly inclined to the vertical as at 134 (see Fig. 10). All of the lugs 131 with the exception of that at the extreme right as seen in Fig. 10 are provided with secondary lugs 135, such lugs extending from the front surface 130 of the bar 126 and having downwardly inclined front faces 136. The lugs 135 thus constitute wedge-like members whose bases are downwardly directed. The bars 126, with their lugs, are arranged as clearly seen in Figs. 7 to 9 directly below the discharge end of the magazine, the arrangement being such that the lower end of one leg of a drop wire, as it is fed downwardly by the feed rolls, tends to contact with a surface 136 at a point adjacent the upper end thereof. The spaces between adjacent lugs 131 are substantially equal to the width of a drop wire, and as the latter is fed downwardly one leg only of the drop wire comes in contact with the surface 136 as above described while the other leg thereof is presented opposite to the space 137 lying between the right hand face of one of the lugs 135 and the left hand face 134 of the next adjacent lug 131 to the right thereof.

To the shaft 111 outside of the frame member 3 is fixed the crank arm 138 (Fig. 35) having the crank pin 139 at its end to which is pivoted the upper end of the rod 140. 141 (Figs. 7, 35) is a rocker shaft extending transversely between frame members 3, 4 and journalled therein. Fixed to the left hand end of the rocker is the crank arm 141ª having the crank pin 142 pivotally secured to the lower end of the rod 140. The lengths of the cranks 138 and 141ª are so chosen that rotation of the crank 138 with the shaft 111 imparts rocking motion to the shaft 141 by means of connecting rod 140.

At a point just within frame members 3, 4, the rocker shaft 141 is provided with brackets 144, said brackets serving to support between them the transversely extending bar 145 hereinafter referred to as a presser bar. Referring to Fig. 9, W indicates the position of a warp thread supported to receive a drop wire thereover. As the drop wire is fed downwardly, one leg thereof as described, comes into contact with the surface 136 and the other leg passes downwardly into the space 137. As the drop wire is at this time substantially unsupported at its central part both of its ends would, unless prevented, tend to follow the surface 136 and thus in many cases would fail to properly take over the warp thread. The presser bar is so arranged and actuated at the proper time in the downward movement of the drop wire, that its edge is moved rearwardly into engagement with such wire. The wire is thus forced rearwardly and the end of the leg thereof which occupies space 137 is caused to follow the surface 130 while the end of the other leg by its engagement with the surface 136 is forced to move forwardly, thus leaving a space between the ends of the legs in a front to rear direction. As the drop wire now continues to move downwardly, the respective legs pass on opposite sides of the warp thread with certainty, thus permitting the machine to place the drop wires upon their respective warps without probability of error.

Secured to the lower portion of the bar 126 are a series of downwardly directed brackets 146 having secured thereto forwardly extended supporting bars 147. The bars 147 may, if desired, be of circular cross section, although preferably they are flattened laterally as herein illustrated and may if desired be of rectangular cross section, the lateral dimensions thereof, in any case being such as to permit them readily to pass between the legs of a drop wire which may be supported thereon. The several bars 147 are so arranged and spaced relatively one to the other as to occupy positions directly below the slots in the drop wires as they are fed downwardly from the respective series in the magazine, the bars 147 for this purpose being located substantially mid-way between adjacent lugs 131.

With the arrangement herein disclosed, and as seen in Fig. 5, in which the unloaded warp threads are indicated at T and the loaded threads at T' it will thus be evident that as the drop wires are discharged from the magazine and fed downwardly they are caused to straddle over the corresponding bars 147 and come to rest with the central webs 148 of the drop wires in contact with the upper surface of said bar. The drop wires as they are discharged from the magazine and placed over the warp threads are not hung directly upon the latter but upon the bars 147 which thus receive the thrust of the drop wires imparted by the feed rolls and insure the warp threads against being subjected to a breaking strain. One or more of the bars 147 may, if desired, be provided with rearwardly extended, curved horns 149, said horns as clearly indicated in Fig. 5 riding over the warp threads supported in the loom frame, and all of the threads of the warp sheet are thus caused to pass downwardly below the bars 147 into a single plane. When in this position the placing of the drop wires upon the warp threads is much facilitated.

The flattened lateral faces of the bars 147 serve in cooperation with the warp threads, to oppose any lateral tipping of the drop wires as they are deposited upon the threads, and thus any intermingling of the drop wires of the several parallel banks or series is avoided. By the time the drop wires reach the forward ends of the bars 147, a sufficient number of the same have been placed in contact to provide the necessary friction to avoid said tipping while the gradual movement of a drop wire down the inclined front end of the bar prevents any severe shock to the warp when the weight of the wire is finally imposed thereon. Secured across the front of the machine as by means of bolts 111$^a$ is a bar 111$^b$, said bar having a series of rearwardly extending lugs 111$^c$, (Fig. 4). Each of said lugs is provided with a rearwardly opening chamber in which is slidably supported a plunger 111$^d$ (Fig. 5). The member 111$^d$ has a reduced extremity or tail 111$^e$ which has surrounding the same a coiled spring seated within said chamber and which serves resiliently to urge the said member 111$^d$ in a rearward direction. The part 111$^d$ has a box 111$^g$ at its rear end forming a socket for the reception of a wiper element 111$^h$ of absorbent material such for example as felt. The several wipers are arranged to engage the surfaces of the corresponding rolls 112 and by contact therewith to keep the surfaces of such rolls clean and free from oil or other dirt which might otherwise be transferred to the drop wires thus causing injury to the warp threads. If desired the wipers may be kept moist with some suitable solvent such as alcohol or gasoline.

Lease rods.

150 is a bracket which may be supported upon the rail 1, or upon the loom frame, this bracket extending to the left of the rail as seen in Fig. 3. Additional brackets similar to bracket 150 but not shown herein, will be provided at suitable points in the length of the rail 1 or loom frame, such brackets serving to support the large lease rod 151 and 152 and also the small lease rods 153 and 154. The lease rods 151 and 152 are of proper diameter to maintain the planes of the upper and lower series of warps at a sufficient distance apart to permit operation of the holdbacks hereinafter to be described. The small lease rods 153 and 154 are of the diameter which permits them to be placed closely together without subjecting the warps to undue strain. The crossing of the warps of the two series takes place between such small lease rods.

Warp separating.

On the shaft 111 is fixed a gear 155, (Fig. 1) said gear meshing with an idler gear 156 carried upon a stub shaft secured to the frame member 4. Engaging with the idler gear 156 is the gear 157 mounted upon the right hand end of a shaft 158 which extends transversely across the frame, and to the left of the frame member 3, as clearly indicated in Fig. 3. Fixed to the left hand extremity of shaft 158 is a bracket 159 (Fig. 25) carrying a substantially flat plate 160. Cooperating with plate 160 is a second plate 161 which may be adjustably secured to the plate 160 by means of screws 162 or in any suitable and desirable manner. Between member 160 and 161 which, together with screws 162, constitute a clamp, may be secured a member 163 of steel to other suitable material having its lower end formed as a thin flexible selector blade 164 arranged to engage warp threads adjacent the crossing point of the leased warps, whereby to separate said warps one by one. The parts are so arranged that as shaft 158 rotates, blade 164 will be caused to rotate in the plane of the crossing of the leased warps and in a counter-clockwise direction as seen in Fig. 2. The shaft 105, upon which gear 86 is mounted, extends transversely across the frame, and at the left of frame member 3 has fixed upon it a pair of cams 165—166. These cams are of complemental form having active faces 167 and interposed dwells 168. 169 (Fig. 2) is a stub shaft extending to the left from frame member 3 and has mounted thereon a pair of rock arms 170, 171 respectively, said arms being provided at points intermediate of their lengths with rolls 172 and 173 respectively. Rolls 172 and 173 are arranged to engage the surfaces of the cams 165 and 166 respectively. 174 is a fixed shaft extending to the left from the frame member 3, and mounted to rock on shaft 174 are a pair of brackets 175, and 176 (Fig. 3). The brackets 175 and 176 are extended above shaft 174 upon which they are pivoted, and secured to the bracket 175 is a rod 177 extending to the right toward frame member 3. At its right hand extremity rod 177 has fixed thereto a crank arm 178 to the lower end of which is connected the rear end of a connecting rod 179 whose forward end is pivoted to the lower end of the arm 171. The bracket 176 is likewise provided with a rod 180 extending to the right, and to which is secured the upper end of a crank arm 181 connected by means of a connecting rod 182 with the lower end of the rocker arm 170. Fixed upon the shaft 174 are collars such as 183, having ears 184 to which are connected the lower ends of springs 185 and 186, said springs being connected respectively at their upper extremities to ears 187 and 188 extending from collars 189 and 190 (Fig. 4) respectively carried upon the bars 177 and 180. By the arrangement herein described, it will be evident that upon rotation of shaft 105, movement of oscillation will be imparted to the brackets 175 and 176 and associated parts, such movements taking place in alternation and the parts being so relatively arranged that the long circular dwell of one cam acts to hold one of said brackets stationary during substantially the full movement of the other bracket in swinging toward or from such position, and vice versa. The springs 185 and 186 serve at all times to keep rolls 172 and 173 in engagement with their respective cams.

Secured in the lower ends of the respective brackets 175 and 176 are hold-back bars on arms 191 and 192. The arm 191 is substantially straight from its end to its bracket, while arm 192 is of irregular form as shown in Fig. 2 to prevent interference with the shaft 158. The lower portions of the hold-back arms are substantially straight and are provided with warp engaging recesses 193 and 194, such recesses being of vertically elongated form, thus serving to provide against escape of the warp threads below the ends of the arms. The hold-back arms or bars as described are so located relatively to the crossing point of the leased warps that the bar 191 is to the left of the lease crossing (see Figs. 18 and 19) while bar 192 lies to the right of the lease crossing. These bars furthermore are of such a length as to permit them to contact only with those threads of the warp lying in the upper plane, the position of the lower end of bar 191 being clearly shown in Fig. 19.

As heretofore described, shaft 22 carries at its opposite ends triple cranks comprising crank pins 29, 30, 31;—32, 33, 34 respectively. The crank arms for the respective crank pins are herein designated as 29$^a$, 30$^a$, 31$^a$;—32$^a$, 33$^a$, 34$^a$. To the crank pins upon opposite sides of the machine are pivotally secured connecting rods 195, 196, 197;—198, 199, 200. A bracket 201 extends to the left of frame member 3 and is secured thereto, and 202 is a bracket extending to the right of frame member 4. The brackets 201 and 202 serve to support series of vertically extending sleeves 203, 204, 205;—206, 207, 208, wherein are arranged for vertical movement a series of rods 209, 210, 211;—212, 213, 214, which are pivotally secured to the lower ends of the respective connecting rods just described.

To the lower portions of the rods 209, 214 (Figs. 1 and 20), are connected brackets 215, 216 respectively, serving to support downwardly directed bars 217, 218 said bars being beveled at their lower ends to form downwardly directed chisel edges as clearly indicated in Figs. 20 and 21 respectively. These brackets with their downwardly extending bars are herein designated as warp retainer members.

To the lower ends of rods 210, 213 are connected brackets 219, 220 respectively. Extending downwardly from said brackets (Figs. 1 and 20) are spaced members 221, 222, 223, 224, respectively. Members 221 and 223 are provided with rearwardly and downwardly curved faces such members converging toward and uniting with the members 222 and 224 respectively, at edges 225 and 226, from which edges, the cam surfaces of members 222 and 224 curve upward and forwardly. To the lower portions of the rods 211, 212 are connected brackets 227 and 228. These brackets support pairs of downwardly directed rods 229, 230, 231, 232, respectively, said rods being spaced apart throughout their upper portions a distance approximately equal to the diameter of the warp threads. At their lower portions the pairs of members 229, 230, 231, 232 diverge to form V-shaped guiding openings 233, 234 to receive and direct the warp threads into the space between said members 229, 230, 231, 232, respectively. Downwardly directed bars 235 and 236 are also carried by the brackets 227 and 228, such bars at their lower ends curving downwardly and to the rear and uniting with the lower portions of bars 230 and 232 to form sharp edges 237 and 238. The bracket members 219 and 220 with the parts supported thereby are hereinafter referred to as warp pusher members, while brackets 227 and 228 with their associated parts may be termed warp positioner members.

The operation of the parts just described will be clear by reference to Figs. 20 to 23 inclusive, it being noted that the arrangement of the parts is substantially alike and the operation thereof simultaneous, at the opposite sides of the machine. It is sufficient however, to provide warp lease bars at one side only of the machine and to have cooperating therewith a single warp separator member 164.

Referring to Fig. 20 a series of unloaded warp threads is indicated A, B, $A^1$, $B^1$, $A^2$, $B^2$, etc. alternate threads lying in the upper plane of the leased warps at opposite sides of the crossing point, the last warp of the A-group being indicated as lying between members 229 and 230 of the warp positioner.

The operation of the warp separating mechanism may be understood from inspection of Figs. 20 to 23 inclusive. In Fig. 20 the hold back finger 191 is shown in position to prevent escape of the forward warp $A'$ of the warps forming the upper series at the left of the crossing point. The positioner C is shown as holding a warp A which has been separated from the upper series of warps at the left of the crossing point, such warp being held thereby in proper relation to the descending drop wire to permit the placing of the latter thereover. The warp hold back finger 192 is shown in forward, inoperative, position; the warp pusher comprising members 221, 222 is in uppermost position, and the warp retainer comprising the element 217 is moving upwardly and is near the upper end of its stroke. As seen in this figure the separator blade 164 is moving downwardly in the direction of the arrow. In Fig. 21 the separator blade 164 has moved downwardly into position to sweep over the series of warps immediately to the rear of the hold back finger 191, it being remembered that such separator blade contacts with the warps substantially in the vertical plane of the crossing of the leased warps and may thus wipe off the end warp thread B of the series lying in the upper plane to the right of the crossing point and which is not restrained by the hold back finger 191 or by any other thread of the series. The retainer has risen to its uppermost point, the positioner is rising and is nearing the upper end of its stroke, and the pusher member is moving downwardly and has engaged the thread A over which the drop wire has been hung, by means of its curved cam surface 222, and is about to push said thread laterally and to the right as seen in Fig. 21. Between the position of Figs. 22 and 23 it is assumed that the separator finger has made one and a quarter turns, the operation having proceeded to a point where threads A and B with their suspended drop wires have been moved forwardly and are restrained against backward movement by the retainer 217. In Fig. 22 the hold back finger 191 has swung into inoperative position, the hold back finger 192 has swung into operative position for restraining the leading warp $B'$ of the series of warps in the upper plane at the right of the crossing point and the warp thread $A'$ has been left by the separator blade where it may be engaged by the positioner upon the next descent of the latter. The pusher has descended to its lowest point carrying the threads A and B into the loaded series and the retainer has moved downwardly into position to retain said threads A and B against rearward movement upon the recession of the pusher member. The separator blade is shown as having passed out of engagement with the warp threads and is moving upwardly to complete its revolution.

In Fig. 23 the retainer member has moved to its lowermost position. The hold back finger 191 has started to release the foremost warp $B^1$ of the upper series to the right of the crossing point, so that such warp may be picked off by the separator member when the latter reaches the plane of the warps, while the hold back finger 192 is just assuming its position ready to hold back the foremost warp $A^2$ of the upper series to the left of the crossing point. The thread $A'$ is positively held against lateral movement by engagement in the slot between members 229, 230 and is ready for the discharge of a drop wire thereon. These operations are repeated successively, whereby warps are picked off alternately from the upper and lower planes of the leased warps, held by the positioner while a drop wire is placed thereon, pushed over into the loaded series by the pusher element and retained against rearward movement by the retainer member. The general arrangement of the several parts is clearly shown in plan in Fig. 24.

Stop mechanism.

For stopping the machine automatically upon the breakage or absence of a warp thread, a stop mechanism such as hereinafter described may be employed. As above noted the machine is preferably driven by an electric motor mounted directly upon the machine frame or upon a part carried thereby. 240 (Fig. 1) is an insulating plate secured upon the bars 15, 17 of the machine frame in any desired manner, such plate having mounted thereon a magnetic circuit breaker of any desired form. This circuit breaker is herein shown diagrammatically (Fig. 32) as comprising electro-magnets 241, 242 having wires 243, 244 leading therefrom. 245 is an armature lever carrying an armature operable by the magnets 241, 242, such lever serving to make and break a circuit comprising the wires 246, 247, such wires being included in the circuit through which the motor is driven. One of the wires as 244 from the magnets may extend to one of the poles of a battery or other source of electrical energy the opposite pole of such battery being grounded on the machine frame as at 244ª. The other terminal 243 is connected by means of a suitable conductor 249 with a plate 250 (see Figs. 2, 4, 29 and 30) carried by an insulating bracket 251 secured to the machine frame in any suitable manner. The plate 250 is provided with a lower member 252 extending at right angles to the main portion thereof, and in a substantially horizontal plane. This portion of the plate may if desired be somewhat concave on its upper surface, this, however, not being essential.

The warp retainer member heretofore described and comprising the bracket 215 and the rod 217 which is located at that side of the machine upon which the bracket 251 is mounted, has fixed therein a pair of downwardly extending guide rods 253, 254 (see Figs. 29 and 30) said rods being substantially parallel and serving to guide a feeler plate 255 which is vertically slidable thereon. Connected to the central portion of the feeler plate 255 is a rod 256 of small diameter which extends upwardly through a suitable guide opening in the bracket 215 and at a point 257 is bent at substantially right angles to lie in a horizontal plane, the outer end of such horizontal extending portion 258 overlying the horizontal element 252 of the contact plate 250. In Fig. 30 it will be seen that the upper surface of the bracket 215, when the retainer member is lifted, serves to lift and support the feeler member 255 by engagement with the member 258. W in Fig. 30 indicates the position of the warp thread arranged to receive a drop wire thereon, this being the position in which the thread is held by the slot in the positioner. In such position, upon downward movement of the retainer, the feeler bar 255 is permitted to rest upon the warp W if the latter is properly positioned, and thus as the retainer continues to descend the member 258 is supported above the upper surface of the member 252, thereby avoiding contact between the latter two members. If, while so supported, the warp thread W should break during the placing of the drop wire thereon or if, upon the descent of the retainer, the member 255 should encounter no warp thread, such member will continue to descend with the retainer bracket 215 until the member 258 rests upon the member 252. Electrical contact will then be established through the conductor 249 and the frame of the machine whereby the magnets 241, 242 will be energized thereby breaking the circuit including the motor windings, causing the motor to stop and bringing the machine to rest.

Under some circumstances it is found desirable to provide the retainer bracket 215 with a second downwardly extending rod 259 having the guide rods 253, 254 disposed between said latter rod and the rod 217. The rod 259 serves particularly in abrupt stopping of the machine, to prevent improper displacement of the warps of the leased series and to assist the hold backs in retaining such warps and preventing tangling of the same.

While the resilient metallic plate 164 is in most instances desirable as a means for separating the warps, it is found under some circumstances, particularly with very delicate silk warps, that such a metallic separator plate tends to abraid the warps in being dragged over the same. As an alternative form of a separator device, that shown in Figs. 27 and 28 may be employed. In such figures, a holder 260 may be clamped between the plates 161 and 160, said holder being twisted as indicated at 261 whereby its lower end lies in a plane substantially perpendicular to the plates 161 and 160. Secured in the lower end of the holder are a series of brush tufts of bristles 262. Such bristles may be of hair, fiber, or of fine wire as desired and are preferably beveled off as indicated at 263. As the member 159 sweeps around in the direction of the arrow, see Fig. 27, the brush bristles are caused to contact with the warps and to separate the last warp of the series by a very delicate contact therewith, the beveled edge of the brush providing against unnecessary contact of the bristles with the warps which are restrained against movement by the hold-back device.

Under some circumstances it is found that the pickers in moving downwardly in a path parallel to the drop wires tend to project over the edge of the leading drop wire to a distance greater than its thickness and are thereby caused to engage the next successive drop wire, thus causing the feeding of two wires simultaneously. To avoid all possibility of such action the arrangement shown in Fig. 15 may be employed, in which the picker member 87 is mounted in a bracket 90 in a manner similar to the pickers already described. The guide rods 95$^a$ however, as shown in Fig. 15 are disposed at a slight angle to the vertical, the arrangement being such that as the picker moves from its uppermost position it is caused first to engage with the upper edge of the leading drop wire over but a small portion of the area of such edge, but as the picker moves downwardly it is moved rearwardly simultaneously with its downward movement whereby it is caused before reaching its lowermost limit to engage over substantially the entire width of the drop wire. It will be readily appreciated that with this arrangement it will be impossible for the picker to contact the edge of more than one drop wire, for as soon as the leading drop wire has moved slightly downward, its edge is no longer on a level with that of the next succeeding drop wire and thus there is no possibility of passage of the end of the picker member over the edge of such next drop wire.

Although the device hereinbefore described for adjusting the picker elements is a preferred form, it is found under some circumstances desirable to provide a more delicate adjustment for these elements, and to this end the arrangement shown in Figs. 13 and 14 may be employed. In these figures the bracket 90 is provided with a guide opening for the picker 87 in the same manner as previously described, but upon the forward portion of the bracket is provided an upstanding arm 165$^a$ and an outstanding ear 166$^a$. Pivoted upon the ear 166$^a$ is a bell crank lever 167$^a$ having a downwardly extending arm 168$^a$ pivotally connected to the picker member 87, a spring 169$^a$ being interposed between the forward face of the bracket and the connection of said picker to the arm 168. The lever 167$^a$ has an upstanding arm 170$^a$ substantially longer than the arm 168$^a$, such arm having passing through an opening therein a screw threaded rod 171$^a$, said rod engaging a screw threaded opening 172$^a$ in the arm 165$^a$ and being provided with a slotted head 173$^a$ whereby it may be turned. A lock nut 174$^a$ may also be provided for holding the screw in adjusted position. With this arrangement, by reason of the long lever arm 170$^a$ and the screw threads 171$^a$, a very delicate adjustment of the picker 87 may be secured.

Operation.

While the mode of operation of the various elements has been described at length, the general operation of the machine may be described briefly as follows: The warp beam having been placed in the loom and the warps having been threaded through the usual heddles and secured to the cloth beam, the rails 1, 2 will be supported upon the loom frame and the brackets 150 with the lease rods will also be secured in position. The lease rods will be inserted between the warps in the usual manner forming two series of warps crossing each other at the point X (Fig. 18) and thus providing spaced upper and lower sheets of warps to the left and right of such point as clearly indicated in Figs. 19 and 20$^a$. The machine will be positioned at the right-hand side of the loom with one of the hold back fingers engaging the foremost one of the upper sets of warps at one side of the crossing point. The several magazine bars 40, 41, 42 and 43 will be provided with drop wires arranged in compact series and held in position by the follower plates 55. The motor will now be started whereupon, by rotation of the crank shaft 22, the triple cranks will be rotated and through the gear train comprising the gears 35, 108, 107, 86, 104, 103, 114, 155, 156 and 157 the various parts of the picker and separator mechanism will be operated. The operation of the picker and separator mechanism has been sufficiently described above so that it is merely necessary to state that the foremost warp thread A′ of the upper plane at the left of the crossing point (see Fig. 20$^a$) will be held back while the foremost warp thread B of the other series in the upper plane at the right and which is not restrained, will be picked off by the separator member. It will readily be understood that the next succeeding warp B′ in the upper plane at the right is restrained against movement due to the fact that it is in crossing relation with the next warp A′ of the upper plane at the left, which is positively held back. Thus but one thread at a time may be picked off by the separator, such thread being held in position in the slot in the positioning member while a drop wire is picked off from one of the magazine bars by the corresponding picker, fed downwardly by the corresponding feed roll and pushed back into engagement with the inclined surface 136 of the corresponding lug 135 and against the vertical surface 130 of the bar 126, whereby the lower ends of the drop wire are spread to permit them to be straddled over the warp and over the corresponding bar 147. As the wire is discharged from the feed rolls it drops upon said bar 147, the cross member 148 of the wire resting upon said bar. The machine thus continues to operate, picking the threads alternately first from the left upper plane and then from the right upper plane as seen in Fig. 20ª, placing such threads in position for the reception of a drop wire and then by means of the pusher and retainer elements moving such loaded threads forwardly and into the loaded series. As the loaded threads are moved forwardly, the drop wires supported upon the bars 147 are caused gradually to move toward the forward ends of the same until they are discharged therefrom, then resting directly upon the warp threads. During the traverse of the drop wires along the bars 147 they are prevented from tipping sidewise, by engagement therewith and when they are discharged therefrom, the downward movement is so slight as to impose little strain upon the warps with which they then engage. The machine is gradually traversed along the tracks by means of the hand wheel 14 whereby to permit the separator member to come in contact with new warp threads of the series.

As the machine operates, the pawl 79 intermittently moves the ratchet wheel 72 and thus through the screw threaded bars 57, 58 feeds the member 59 with the follower plates 55 forwardly. This carries the series of drop wires supported upon each of the magazine bars into position to be picked off one by one by the picker members. When the magazines are empty, the pawl 79 may be raised by hand and the shaft 70 reversely rotated by means of the handle 78 whereby to bring the follower plates 55 back into their rearmost position to permit the loading of the magazines. The machine is thus traversed across the loom frame over the entire series of warp threads, loading each thread as it passes with a drop wire, it being noted that the pickers are so actuated by the quadruple crank which drives them as to operate in succession. The drop wires are thus moved from the four magazine bars successively and are deposited upon the warps in four parallel banks or series, the proportions of the driving elements being such that the separator blade makes one separating movement corresponding to the downward movement of each of the picker elements. While the machine has been disclosed as comprising four magazine bars together with the corresponding pickers and feed rolls, it is to be understood that any desired number of such magazine bars with the corresponding number of picker and feed elements may be employed without in any manner altering the essential mode of operation of the machine.

While the mechanism has been disclosed as particularly adapted for use in separating detached and independent drop wires from a magazine and for placing such wires over successive warps of a series, it is to be understood that in many of its broader aspects the mechanism is not confined to use with drop wires of a warp stop motion but might be employed whenever it is desired to separate thin, detached, like elements from a series thereof and to place such elements successively in predetermined position of use or for a subsequent operation.

While the arrangement shown in the drawings is a preferred form of the invention it is to be understood that various changes and modifications therein all within the skill of the mechanic may be made without departing from the spirit of the invention.

I claim:

1. In a machine for manipulating detached warp engaging elements, a magazine for such elements, reciprocating means for initiating movement of said elements one by one from said magazine along a substantially rectilinear path, and means for continuing the movement of said elements along said path into warp engaging position.

2. In an apparatus of the class described, a magazine for detached loom elements, means positively engaging the edge of the endmost element in said magazine for partially removing it from the magazine, and means independent of said first named means for completing the removal of said element from the magazine.

3. In combination in a machine for manipulating thin sheet metal loom elements, a magazine for holding such elements in compact series, a reciprocating picker constructed and arranged to engage the edge of the endmost element of said series and to move the same partially from the magazine, and a pair of constantly driven feed rolls arranged to receive such partially ejected element between them and to fully remove it from the magazine and to transfer it to warp engaging position.

4. In a machine for placing detached loom elements one by one in position for engagement by successive warp threads, a magazine for said elements, continuously acting feed mechanism for moving an element engaged thereby in a substantially rectilinear path into position for contact with a warp thread, and intermittently operating means for moving said magazine held elements one by one into position for engagement with said feed mechanism.

5. In a textile machine, a magazine for holding a series of like elements in compact series, means engageable with the edges of said elements for positively pushing them one by one partially out of the magazine, and means for gripping the projecting ends of said elements so pushed out and for pulling them completely from the magazine.

6. In combination, a magazine constructed and arranged to hold a plurality of elements of sheet material in compact, face to face series, a reciprocating member, means to move said member into contact with the edge of a selected element of said series whereby to propel said element partially from the magazine, and a pair of feed rolls for gripping such partially ejected element and for pulling it fully from the magazine.

7. In mechanism of the class described a magazine for detached, warp engaging elements, reciprocating means engageable with the edges of said elements for pushing them partially out of the magazine, and unidirectionally moving means constructed and arranged to receive such elements successively as they are partially ejected from the magazine and to move them along a substantially rectilinear path into position for engagement with warp threads.

8. In combination a magazine for detached, warp engaging elements, a reciprocating picker engageable with the ends of successive elements for partially ejecting them from the magazine, a pair of feed rolls associated therewith, and means for driving said feed rolls, said rolls being constructed and arranged to receive such detached elements one by one as they are partially ejected from the magazine and to move such elements directly into warp engaging position.

9. In combination in a machine of the class described, a magazine for drop wires, a reciprocating drop-wire picker engageable with the edge of a drop wire to initiate its movement from the magazine, and a pair of feed rolls cooperating therewith for completing withdrawal of the wire from the magazine, one of said feed rolls being mounted for movement toward and from the other, and resilient means for urging said movably mounted roll toward the other roll.

10. In combination in a machine for hanging drop wires upon warps, a pair of feed rolls for successively advancing drop wires into position for engagement with the warp threads, and a wiper member engaging the surface of one of said rolls for removing foreign matter therefrom.

11. In a machine of the class described in combination a drop wire feed mechanism comprising a feed roll for advancing drop wires into position for engagement with warp threads, and a wiper cooperating therewith, a movable holder for said wiper and resilient means urging said holder with the wiper toward the roll.

12. In a machine for manipulating thin, flat, detached loom elements, in combination, mechanism for feeding such elements successively in a direction longitudinally of the same, said mechanism comprising a pair of feed rolls, a guide, a holder slidable in said guide toward and from one of said rolls in a substantially radial direction, a wiper of absorbent material mounted in said holder, and resilient means for urging said holder toward said roll whereby to cause resilient contact of the wiper therewith.

13. In a machine for manipulating detached loom elements, a magazine for such elements, means for compacting such elements within the magazine, means for discharging elements from the magazine one by one, and guide means for said elements within the magazine, said guide means being adjustably supported.

14. In combination in a magazine for detached elements, a guide member for said elements within the magazine, means for pivotally supporting said guide member adjacent to one end of the magazine, and adjustable means for supporting the opposite end of said member.

15. In combination in a magazine for detached elements, a guide bar pivotally supported adjacent one of its extremities, a screw threaded rod for supporting the opposite end of said bar, and a manually turnable nut engaging said rod whereby to adjust the same.

16. In combination with a magazine for detached loom elements, means for discharging elements from one end of said magazine, a guide bar extending longitudinally of said magazine for positioning said elements therein, pivot means for supporting said guide bar adjacent the discharge end of the magazine, and manually operable means for vertically adjusting the opposite end of said bar.

17. In a machine for manipulating detached, sheet material elements, a magazine for holding such elements in compact, face to face series, a reciprocating picker engageable with the edges of successive elements for moving them from normal position in the magazine, and means constructed and arranged to cause said picker to engage varying areas of the edge surfaces of said elements during its operative stroke.

18. In combination in a machine for manipulating detached elongated sheet metal warp engaging elements, a magazine for holding such elements on end in compact series, a reciprocating picker for engaging an end surface of such an element in the magazine whereby to import endwise movement thereto, and means for causing said picker to engage a constantly increasing area of said end surface during its operative stroke.

19. In a device for handling thin detached sheet metal elements, a magazine for holding a series of such elements in compact, face to face relation, and reciprocatory means for engaging an edge surface of successive elements of said series whereby to impart movement thereto, said means being so constructed and arranged as to move transversely across said edge toward the next element of said series during its operative stroke.

20. In mechanism of the class described, in combination a hopper for holding a series of sheet metal elements in compact face to face relation, and means movable in a path intersecting the plane of the endmost of said elements, said means being constructed and arranged to engage an edge of said element whereby to move the same relatively to the next adjacent element.

21. In mechanism for manipulating thin sheet metal elements, a reservoir for holding a plurality of such elements in compact series and picker means for moving said elements one by one in an edgewise direction, said picker being constructed and arranged to initiate such movement by engagement with that portion only of the edge of the last element of the series remote from the next adjacent element.

22. In a machine of the class described a frame, a carrier plate adjustable therein, a slot in said plate, a guide bar mounted upon said plate in spaced relation thereto and in the plane of said slot, the axis of said bar being inclined to the surface of the plate, a sleeve slidable on said bar, a picker member mounted on said sleeve and extending through the slot, and means for reciprocating said sleeve along said bar.

23. In combination in a machine for hanging detector elements upon warp threads, means for supporting a sheet of warps, means for separating warps from said sheet one by one, a magazine for detectors, picker means for imparting movement successively to detectors contained in said magazine, a shaft, cranks upon said shaft, and link and lever connections between said cranks and said picking means.

24. In a machine of the class described a magazine device comprising a plurality of compartments for thin sheet metal elements, reciprocating pickers for removing such elements one by one from the several compartments, a rotary shaft, a plurality of cranks upon said shaft corresponding in number to the magazine compartments, and connections from each crank to a corresponding picker.

25. In combination in a machine for manipulating detached warp elements, a quadruplex magazine for supporting such elements in four independent series, picker means arranged to engage successively an element of each of said series, a rotatable shaft having four cranks arranged substantially ninety degrees from one another, and means connecting each of said cranks with one of said picker means.

26. In combination in a device for manipulating like elements in series, selector means for picking off successive elements from said series, said means comprising a finger for engagement with said elements, means for moving said finger in a predetermined path, and means for adjusting said finger in a direction substantially perpendicular to said path.

27. In a device of the class described and comprising a magazine for a series of like elements, a picker finger for engaging successive elements of said series, a lever having said picker mounted upon one arm thereof, and adjustable means for determining the position of the other arm of said lever.

28. In a device of the class described, a reciprocating support, a lever pivoted thereon and having long and short arms, a selector carried by the short arm of said lever and means engageable with the long arm of said lever for adjusting the position thereof relatively to the support.

29. In apparatus for selecting successive elements from a series of elements, a slidable support, means for reciprocating said support, a bell-crank lever mounted upon said support, a selector mounted upon one arm of said lever, and micrometer means for adjusting the position of the other arm of said lever.

30. In an apparatus of the class described, a frame having longitudinal slots therein, a support adjustably engaging said slots, and a reciprocatory picker device slidably guided upon said support.

31. In mechanism for placing a detector element in position for engagement with a warp thread, a frame having vertically arranged guideways, a support adjustably positioned upon said guideways, a magazine for detector elements, a picker for imparting movement to a detector element held in said magazine, and means carried by said support for guiding said picker in its operative movements.

32. In combination in an apparatus for moving a detached element into position for engagement with a thread, means for imparting movement to said element in a direction transverse to said thread, and means for guarding said thread from breakage by excessive movement of said element.

33. In a machine of the class described, a holder for a detached element, means for supporting a thread, means for moving said element in a path intersecting the thread, and a member interposed between the thread and said element whereby to limit the movement of the latter as it approaches the thread.

34. In an apparatus for engaging a detached element with a thread, in combination a support for a thread, a holder for a detached element, mechanism for moving such element in a path intersecting the thread, and a rigid abutment constructed and arranged to arrest such movement of said element prior to the positive engagement thereof with the thread.

35. In a device for hanging a bifurcated element upon a strand, a holder for such an element, means for advancing the bifurcated portion of said element in a direction to take over said strand, and a support interposed between said strand and element and constructed and arranged temporarily to receive and support said element upon stopping of said advancing means.

36. In combination in apparatus for manipulating detached bifurcated thread engaging elements a support for a thread, means for slidably advancing such an element with its bifurcated portion directed toward said thread to take over the same, and a rigid rod of a diameter to pass within the bifurcated portion of said element and interposed between the latter and the thread.

37. In a device for hanging "hair-pin" drop wires upon warp threads, means for supporting a warp thread in a substantially horizontal plane, means for impelling a drop wire in a path whereby to cause it to take over said warp thread, and a substantially rigid rod extending across said thread and in the path of said drop wires, said rod being constructed and arranged temporarily to receive and support the weight of said drop wire.

38. In a device for moving detached elements into position for engagement by a thread, means for supporting a thread, means for positioning such a detached element for engagement with a thread, and means for maintaining the thread in a predetermined plane during the movement of said element into engagement therewith.

39. In an apparatus for moving a series of detached elements one by one into position for engagement with successive warps of a series, means for holding a plurality of such elements, means for moving said elements one by one into warp engaging position, and means for maintaining a plurality of said warps in a single predetermined plane for engagement by said elements.

40. In a machine of the class described, a magazine for detached, warp engaging elements, means for supporting and leasing a sheet of warps, means for moving said elements one by one from said magazine into position for engagement by successive warps of the sheet, and means for holding said leased warps in a single predetermined plane for engagement by said elements.

41. In an apparatus of the class described, in combination a magazine for detached detectors, supports for a sheet of warps, means for leasing said warps whereby to form two series thereof lying in different planes, means for separating a warp from said two series alternately, mechanism for successively moving detectors from said magazine into position to engage such picked-off warps, and means for holding the warps of both series in a single plane adjacent the point of engagement of said detectors therewith.

42. In a device for placing a detached element in position for engagement with a strand, a support for a strand, means for moving a detached element into position to engage a strand, and means for preventing angular movement of said element crosswise of the strand after engagement therewith.

43. In a machine for hanging drop wires upon warps, means for supporting a plurality of warps, a plurality of magazines for drop wires, means for moving drop wires from said magazine into engagement with successive warps, and means for preventing drop wires discharged from one of said magazines from engaging drop wires from an adjacent magazine immediately after their engagement with the corresponding warps.

44. In a machine of the class described, a plurality of magazines for drop wires of the hair pin type, means for supporting a sheet of warps, means for receiving drop wires successively from said magazine and for hanging them over said warps, and a plurality of rods, one for each magazine, said rods extending transversely above said warps and constructed and arranged to so support drop wires discharged from the respective magazines as to prevent lateral tipping of such wires and interference of wires from one magazine with those from another.

45. In apparatus for placing hair pin detectors on warp threads, a support for a sheet of warps, guides arranged substantially perpendicular to the plane of said threads, means for moving a detector along said guides and over a thread therebelow, and a substantially rigid rod extending in a direction substantially at right angles to said guides and to said thread, said rod extending from said guides outwardly over a plurality of threads of said sheet and in the path of a detector moving along said guides.

46. In a machine for picking drop wires of the hair pin type from a series, feeding means, and a vertically flattened bar arranged in the line of feed movement of such drop wires, said bar being constructed and arranged to pass between the legs of an oncoming wire and to support the weight thereof when released by the feeding means.

47. In combination in a machine for manipulating bifurcated loom elements, means for feeding forward such elements with the bifurcated portion thereof in advance, and a supporting bar extending in a direction transversely across the path of feed of such element, said bar being of greater dimensions in the feed direction than across the same and being constructed to receive the bifurcated portion of said element in supporting relation thereto.

48. In a machine for bringing detached warp engaging elements into engaging relation with successive warps of a series, means for feeding such elements toward the warp plane, and means for bringing the successive warps of the series into a single plane for engagement by said elements.

49. In an apparatus of the class described, means for moving drop wires successively into position to engage warps of a series, and means for positioning warps for receiving such wires, said positioning means comprising a bar having a substantially horizontal lower surface and a rearwardly extending horn providing an upwardly curved continuation of said surface.

50. In a device for manipulating hair-pin-like metallic elements having spaced legs, means for moving such an element in a predetermined path with the open end thereof in advance, and independent guide means for the spaced legs of said element.

51. A spreader device for drop wires comprising a bar having a substantially plane contact face, and a member projecting outwardly from said face and having a contact surface inclined to said face.

52. In a device of the class described, means for moving a bifurcated element with its open end in advance, and means arranged for sliding engagement with the advancing ends of the opposed legs of said element whereby to constrain such ends to move in non-parallel paths.

53. In a machine for engaging drop wires of the hair pin type with warp threads, means for supporting a warp thread, guide means for constraining a drop wire to move in a predetermined path transversely of such thread, means for moving a drop wire along said path, and a member having a face inclined to said path and constructed and arranged for contact with one leg of a drop wire moving along such path whereby to spring said leg out of its normal plane.

54. In an apparatus of the class described, a guide, means for traversing a bifurcated metallic element along said guide with the open end of said element in advance, and a relatively fixed member having an inclined face, said face being constructed and arranged to engage one leg of said advancing element whereby to spring such leg out of its normal plane.

55. A spreader device for use in a machine of the class described, comprising a bar having a plane front face, a pair of guide members projecting from said face and an element extending outwardly from said face adjacent one of said guides and spaced from the other thereof, said element having a front surface inclined to said face.

56. A spreader device for use in machines of the class described comprising a bar having a plurality of pairs of spaced guide members projecting from the front face thereof, and a lug projecting from said face and contacting with one of the guide members and of a width substantially equal to one half the space between the members of a pair of said guides, said lug having a surface inclined downwardly and forwardly relatively to the front face of the bar.

57. In a device for manipulating metallic drop wires of the hair pin type, means for moving such a drop wire in a predetermined path, and a wedge element interposed in such path and constructed and arranged to engage one leg of an advancing drop wire whereby to spring such leg out of its normal plane.

58. In combination in a machine for hanging hair pin drop wires upon warp threads, a support for a warp thread, means for moving a drop wire toward said thread with its open end in advance, and independent guide channels for the legs of said drop wire, said channels being relatively inclined whereby said legs are constrained to move in nonparallel paths.

59. In an apparatus of the class described, a support for a warp thread, means for moving a bifurcated element toward said warp thread, and guide channels for the respective legs of said element, one of said channels having a leg engaging face inclined relatively to the leg engaging face of the other channel whereby to spread said legs to permit them to take over said warp thread.

60. In a mechanism of the class described, means for supporting a warp thread, means for moving a detector of the hair pin type toward said warp thread with its open end in advance, a guide for the advancing end of said detector and means for pressing the detector against the guide whereby to spring the leg of said detector over the warp thread.

61. In apparatus of the class described, a magazine for holding detectors of the hair pin type, a support for a warp thread, mechanism for moving a detector from the magazine toward a thread so supported, means for springing a leg of the detector out of its normal place as it approaches the warp thread, and a rockable member for pressing said detector into contact with said means.

62. In combination, a magazine for holding detectors of the hair pin type having spaced legs, a support for a warp thread, mechanism for moving a detector from the magazine, and toward a thread so supported with the open end of the detector in advance, a guide having relatively inclined surfaces for engagement with the respective legs of the detector, and a rocker device for thrusting said detector into contact with said guide whereby to spring said legs apart to permit them to straddle the warp thread.

63. In a machine of the class described, means for hanging a detector of the hair pin type upon a selected thread of a series of warp threads, and automatically acting mechanism for stopping the operation of said means upon breakage of such thread prior to engagement of the detector therewith.

64. In a machine for engaging drop wires with warp threads, a support for a series of warp threads, thread selecting means, and a mechanically actuated feeler for determining the presence or absence of a selected thread of said series.

65. In combination, a support for a series of warp threads, means for successively selecting and separating threads from said series, a mechanically actuated feeler for determining the presence or absence of successive threads of said series, and means actuable by said feeler upon absence of a thread of said series for stopping the operation of said selecting means.

66. In a machine of the class described, means for supporting a sheet of warps, mechanically actuated means for engaging drop wires with successive warps, means for stopping such mechanically actuated means, and a detector device normally supported by a warp but operative upon breakage or absence of such warp for actuating said stopping means.

67. In a device of the class described, means for supporting a sheet of warps, mechanism for separating warps from said sheet, means for stopping said mechanism, a detector, means intermittently operative to lift said detector above the plane of said warps and to permit it to descend to engage a warp of said sheet, and connections between said detector and said stopping means whereby to render the latter operative upon failure of the detector to engage a warp in its descent.

68. In a machine of the class described, warp separating means, a warp retainer, a guide member carried by said retainer, a feeler bar slidably guided upon said member, and a contact finger mounted upon said bar and constructed and arranged upon abnormal positioning of said bar to engage a fixed contact element.

69. In combination in a machine for manipulating detached loom elements, movable devices for separating and placing warps successively in desired position, guide means carried by one of said devices, a feeler element slidably guided by said means, a contact finger mounted upon said element, and a fixed contact plate arranged in the path of movement of said finger, said finger and element when in contact serving to close an electrical circuit.

70. In a machine of the class described, warp placing means comprising a vertically movable retainer device, a pair of downwardly extending guides carried thereby, a feeler bar having its ends slidably engaging the respective guides, a rod supported on said bar and guided in an opening in said retainer device, said rod having a horizontally arranged portion constituting a contact element, and a fixed contact plate arranged in the path of said contact element and arranged to be engaged by the latter upon abnormal downward movement of said feeler bar.

71. In a machine for placing drop wires upon loom warps, warp placing means, electrically driven mechanism for actuating the same, a magnetically actuated circuit breaker, a warp feeler associated with said placing means, and devices actuable by said feeler upon breakage or absence of a warp whereby to energize said circuit breaker to cause stoppage of said electrically driven mechanism.

72. In a magazine for detached elements, a bar providing a guiding surface, a relatively fixed abutment adjacent one end of said bar, and means for adjustably supporting said bar whereby the distance between said abutment and the extremity of the guiding surface of said bar may be varied.

73. In combination with a machine for associating detached loom elements with warp threads, a pair of feed rolls for successively advancing said elements, and a wiper for removing foreign matter from one of the rolls, said wiper comprising a movable, spring pressed hollow holder, and a pad secured in the holder and projecting therefrom for engagement with the roll.

74. In combination in a magazine for detached elements, a support adjacent to one end of the magazine, a screw threaded rod having a pair of spaced ears at one end, the rod passing freely through an opening in the support, a nut having threaded engagement with the rod and bearing against the support, and a guide bar for the detached element pivotally mounted between the ears.

75. In combination in a magazine for warp stop drop wires, a guide bar for such wires pivotally supported adjacent to one end of the magazine, a support at the opposite end of the magazine, said support having an opening therein, a threaded rod passing through the opening, a nut having threaded engagement with the opening and resting upon the support, said rod having spaced ears at its upper end, the guide bar being positioned between said ears, and a pin pivotally connecting the bars to the ears.

Signed by me at Lawrence, Massachusetts, this 8th day of January, 1921.

SEBASTIANO MAGNANO.